H. S. MARSH.
CIGAR MACHINE.
APPLICATION FILED JUNE 16, 1913.

1,188,549.

Patented June 27, 1916.
17 SHEETS—SHEET 3.

Witnesses:
Wm H Hawkins
S. G. Taylor

Inventor
Harry S. Marsh
By his Attorneys
Sydney S. Prescott

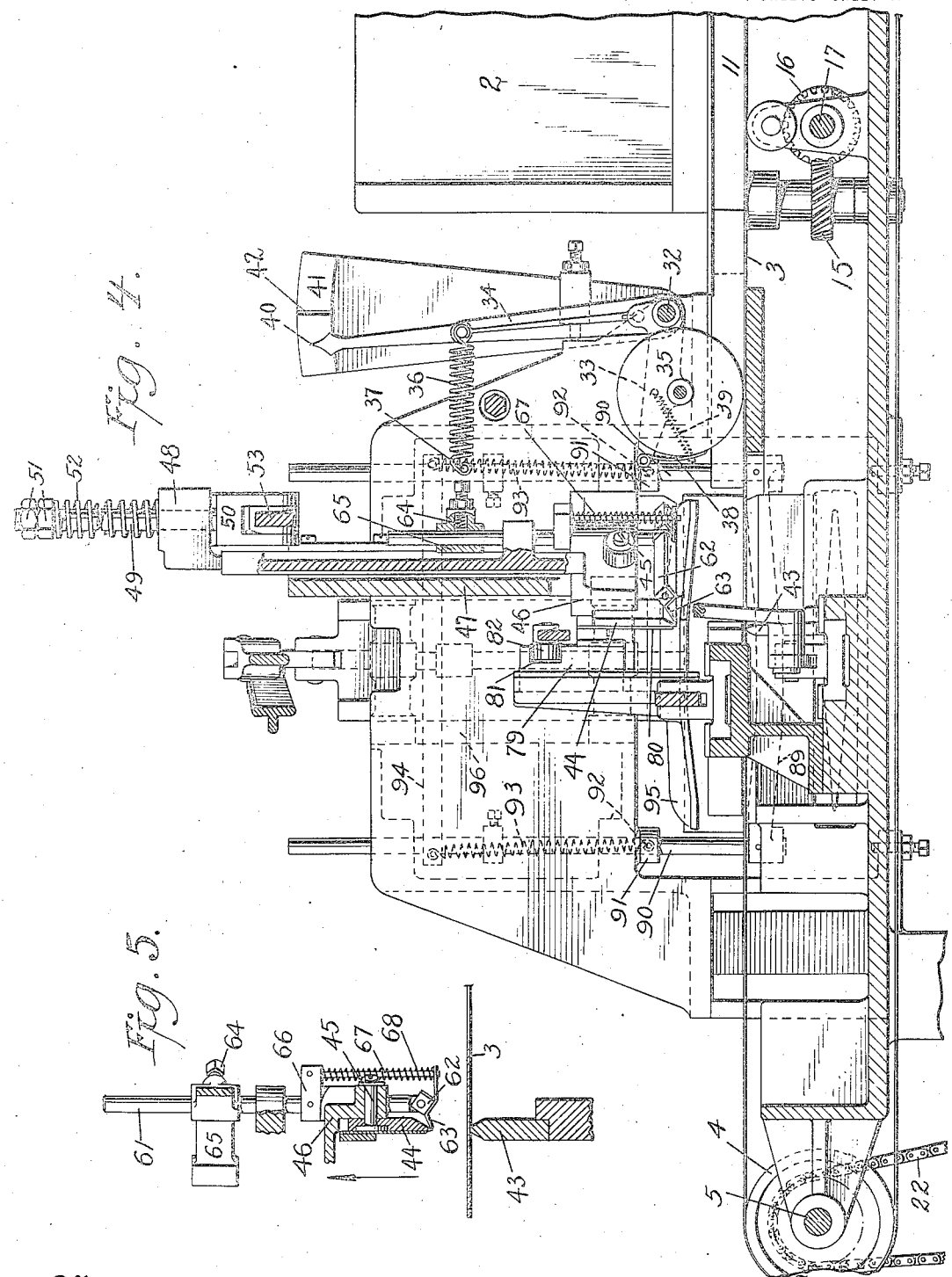

H. S. MARSH.
CIGAR MACHINE.
APPLICATION FILED JUNE 16, 1913.

1,188,549.

Patented June 27, 1916.
17 SHEETS—SHEET 5.

H. S. MARSH.
CIGAR MACHINE.
APPLICATION FILED JUNE 16, 1913.

1,188,549.

Patented June 27, 1916.
17 SHEETS—SHEET 6.

Witnesses:

Inventor
Harry S. Marsh
By his Attorney

H. S. MARSH.
CIGAR MACHINE.
APPLICATION FILED JUNE 16, 1913.

1,188,549.

Patented June 27, 1916.
17 SHEETS—SHEET 7.

Witnesses:

Inventor
Harry S. Marsh
By his Attorney
Sydney Prescott

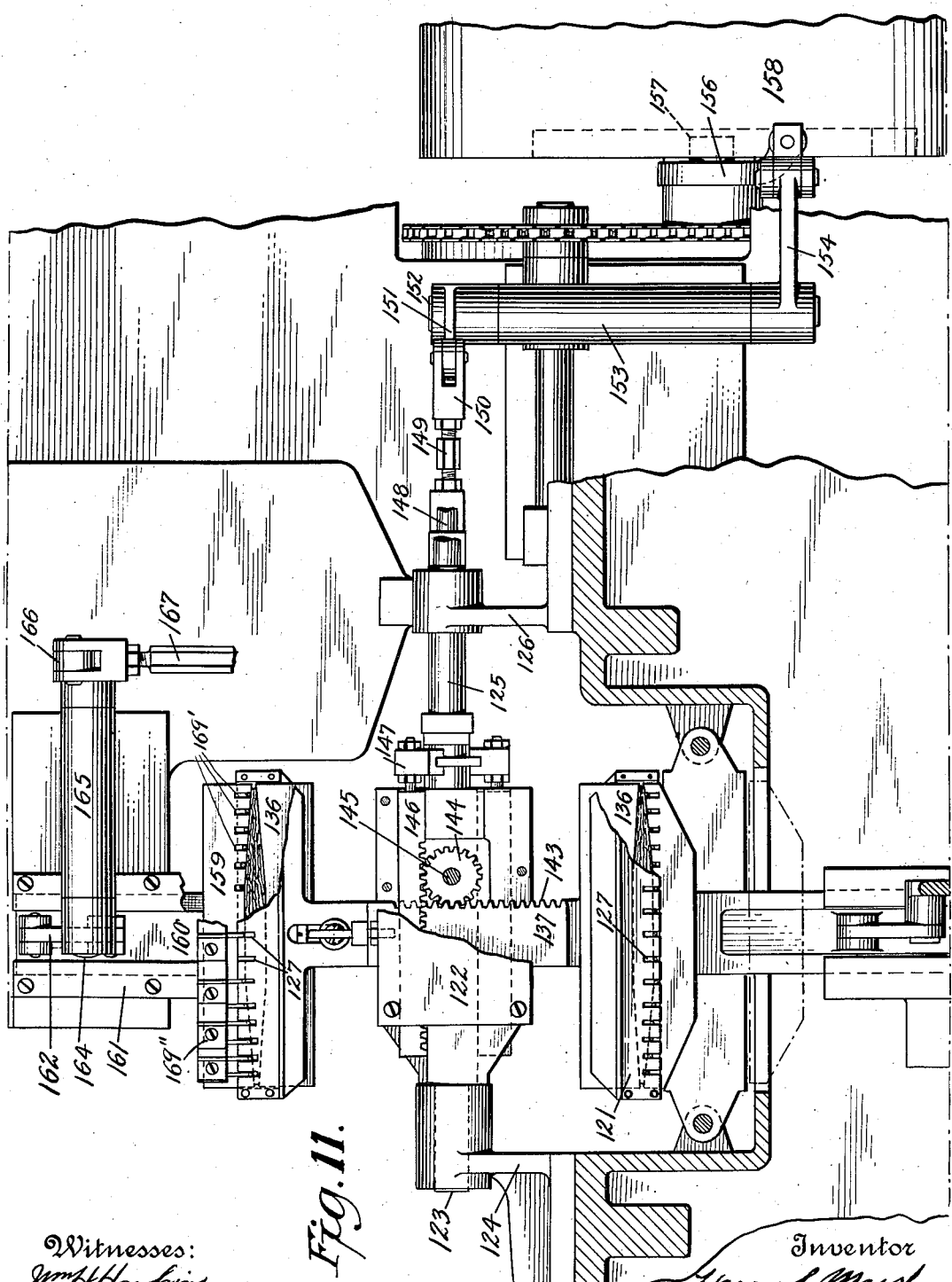

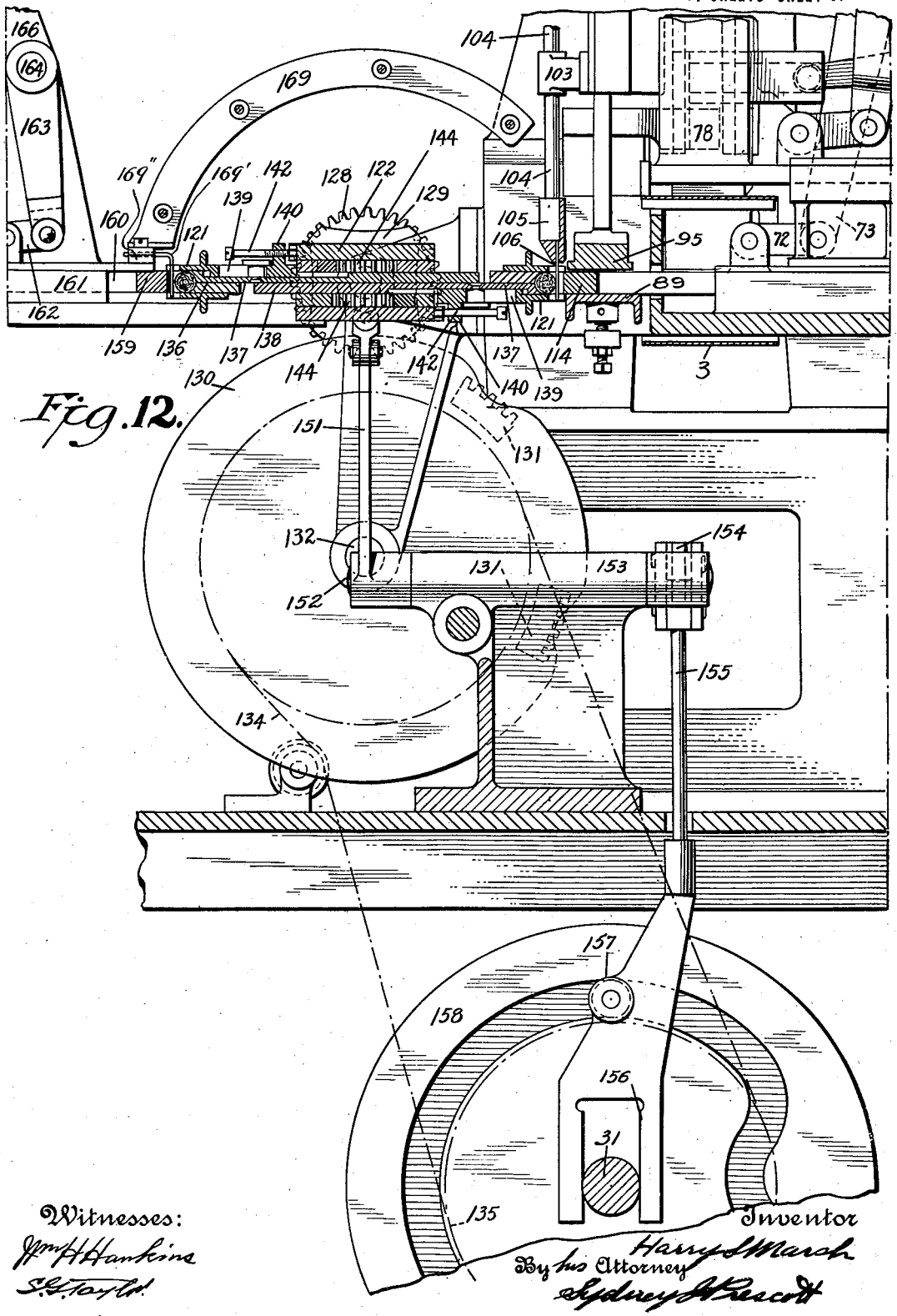

H. S. MARSH.
CIGAR MACHINE.
APPLICATION FILED JUNE 16, 1913.
1,188,549.
Patented June 27, 1916.
17 SHEETS—SHEET 10.
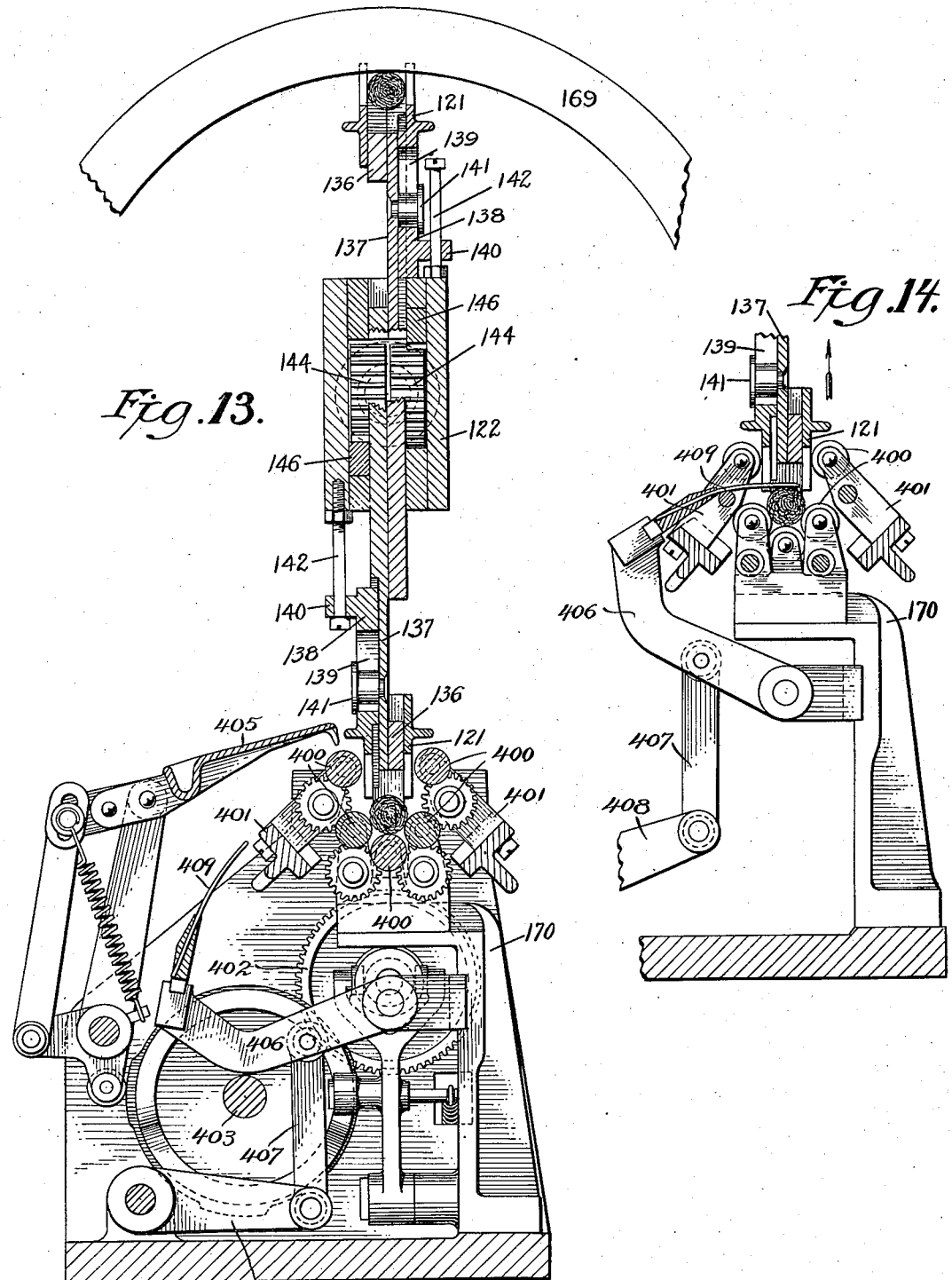

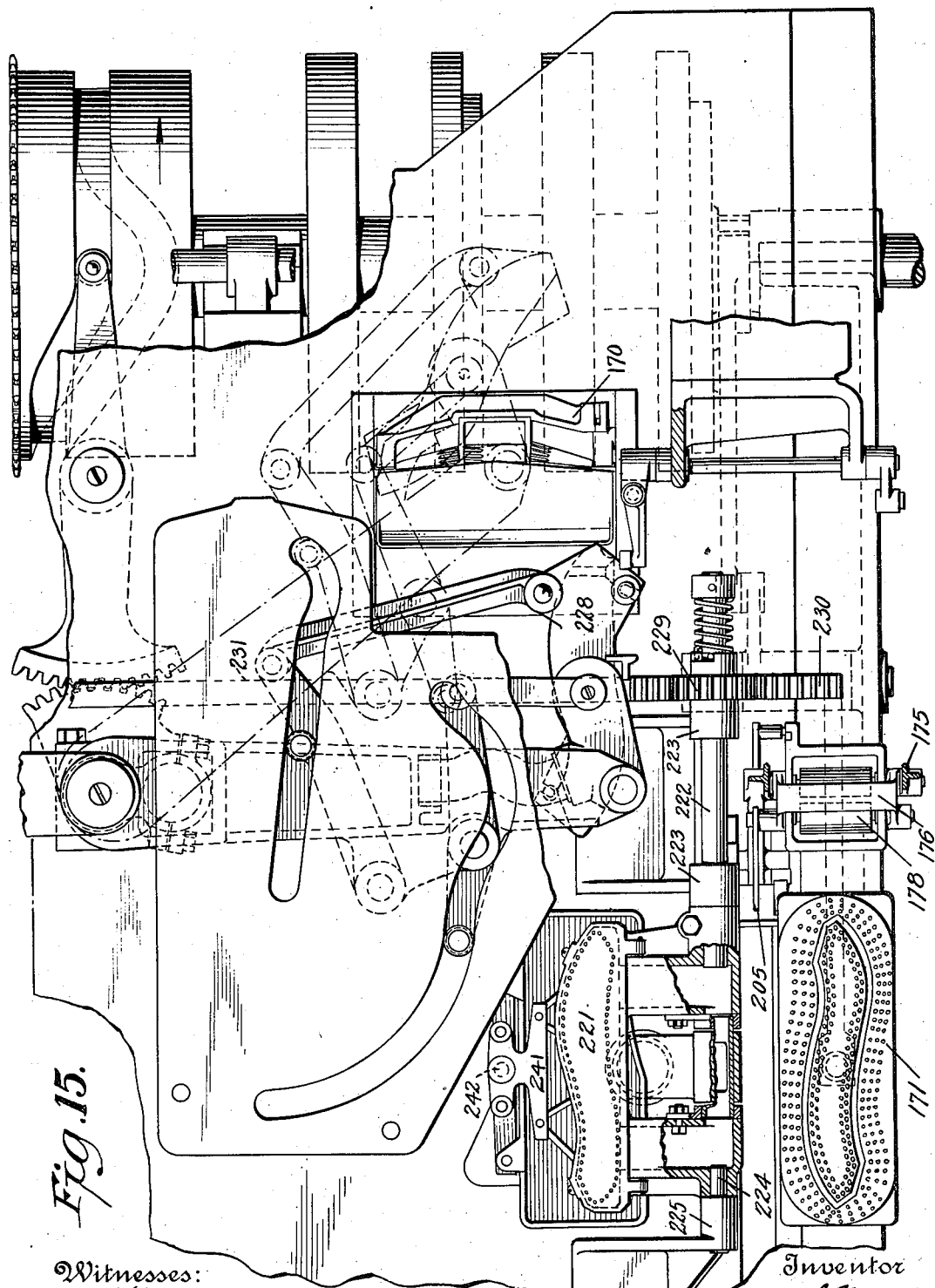

H. S. MARSH.
CIGAR MACHINE.
APPLICATION FILED JUNE 16, 1913.

1,188,549.

Patented June 27, 1916.
17 SHEETS—SHEET 12.

Witnesses:
Inventor
Harry S. Marsh
By his Attorney

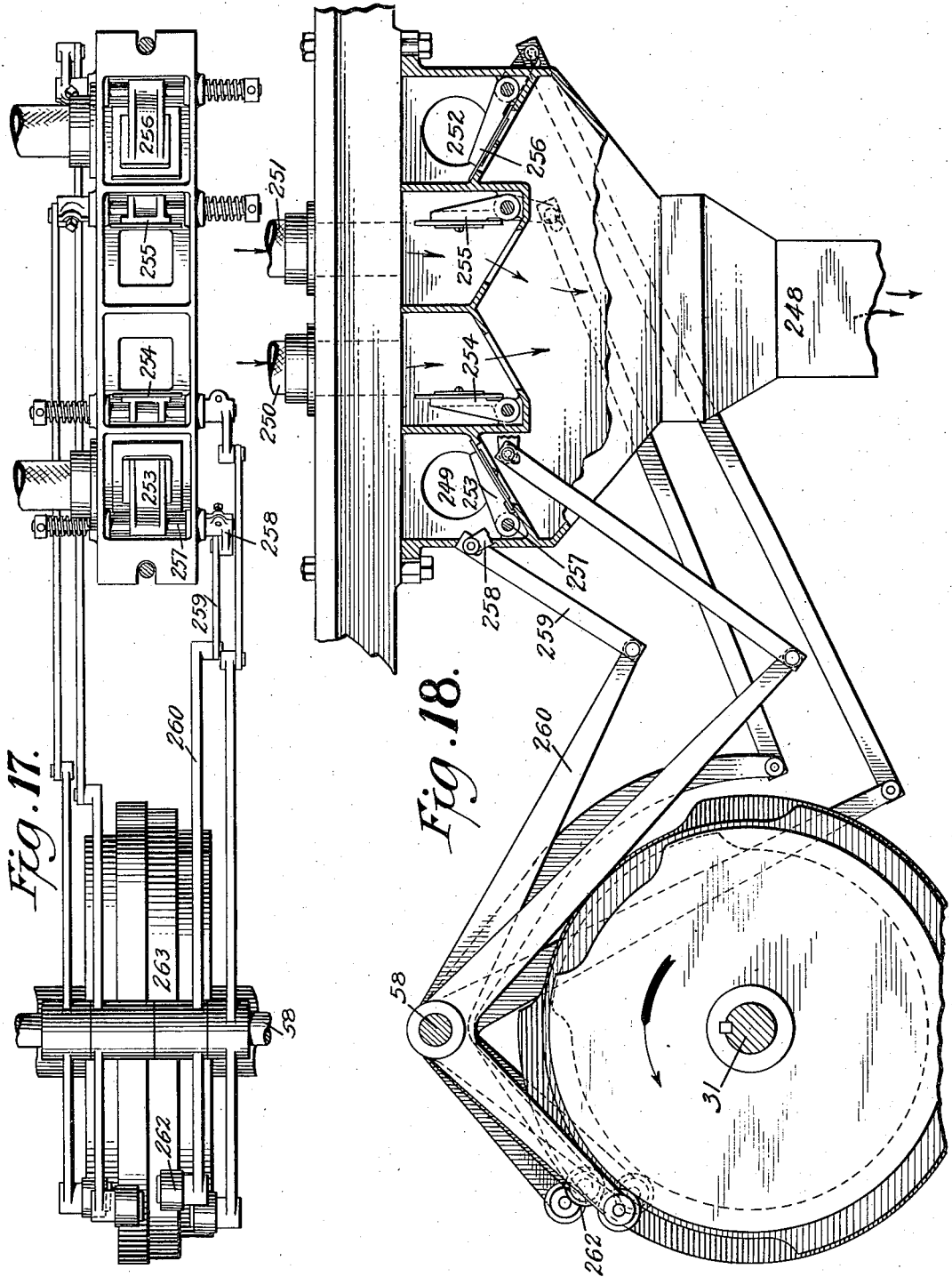

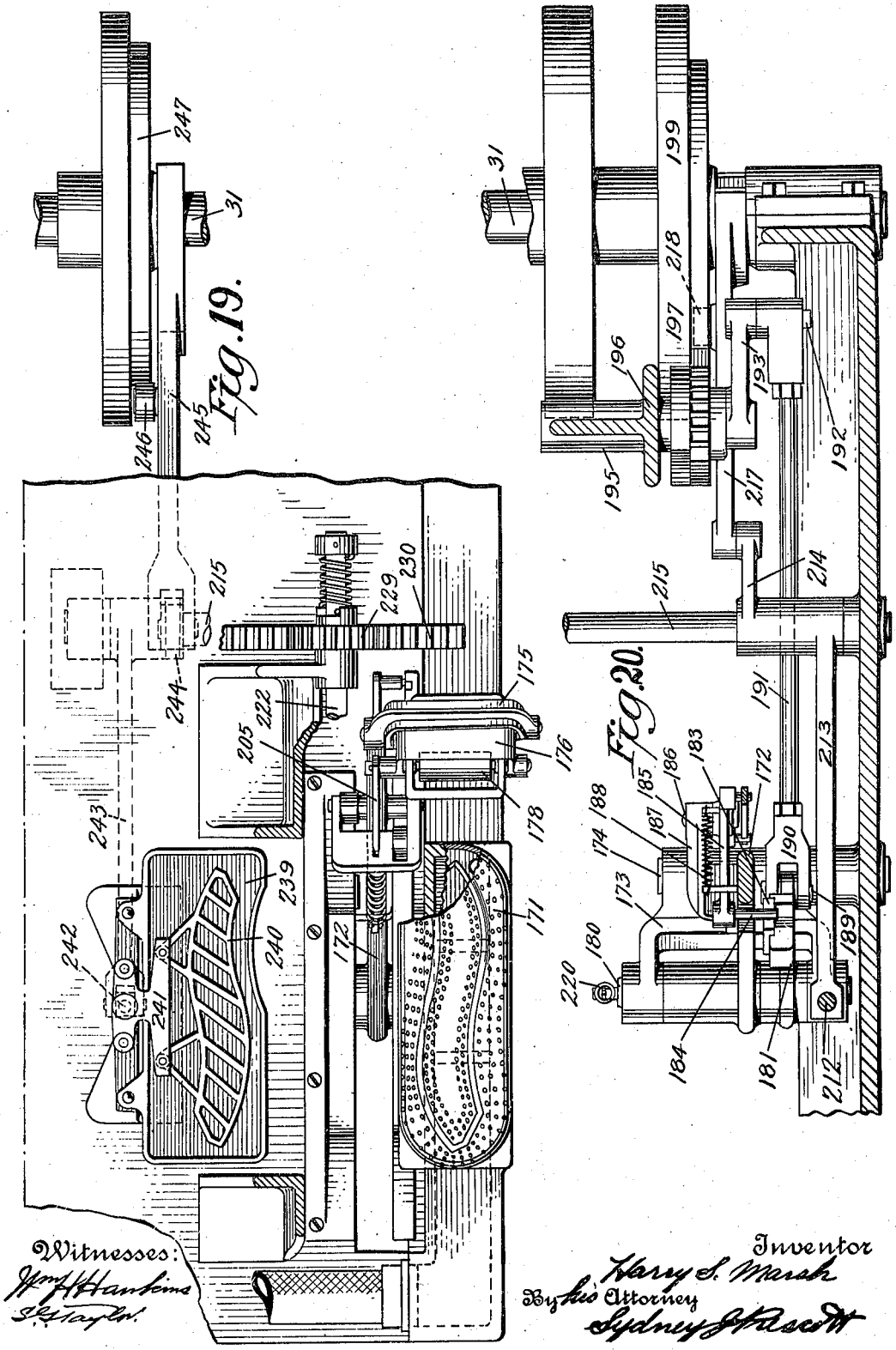

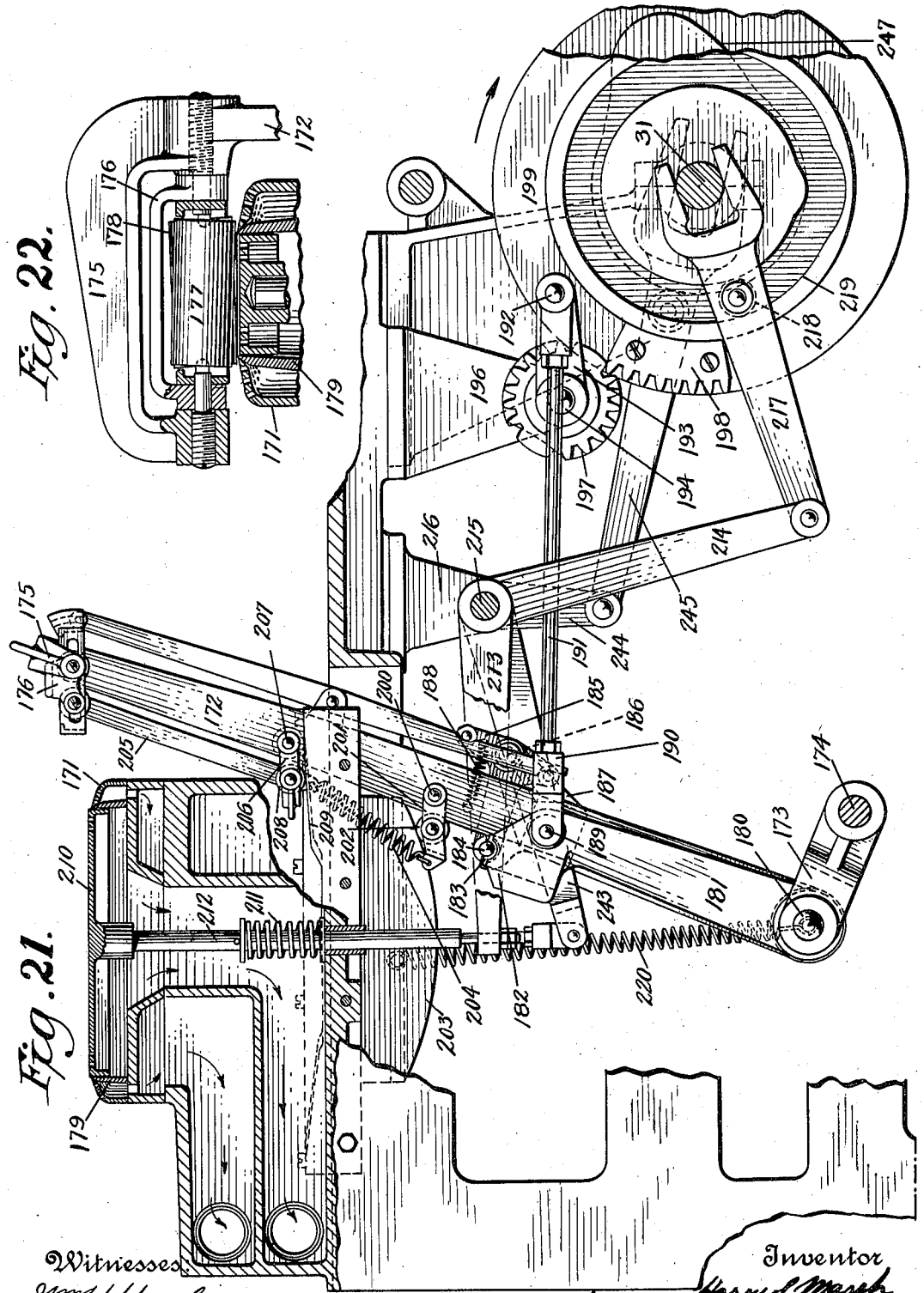

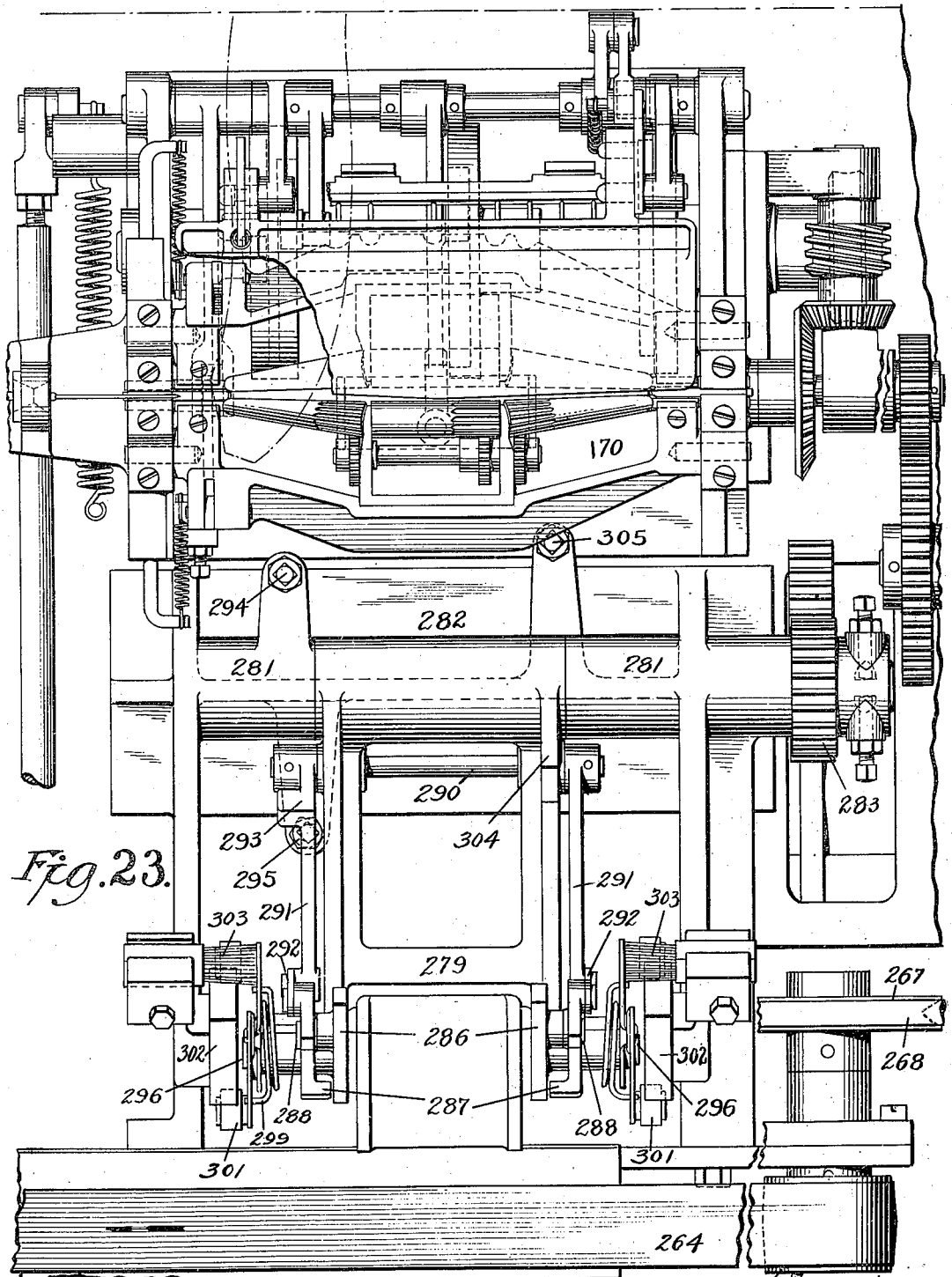

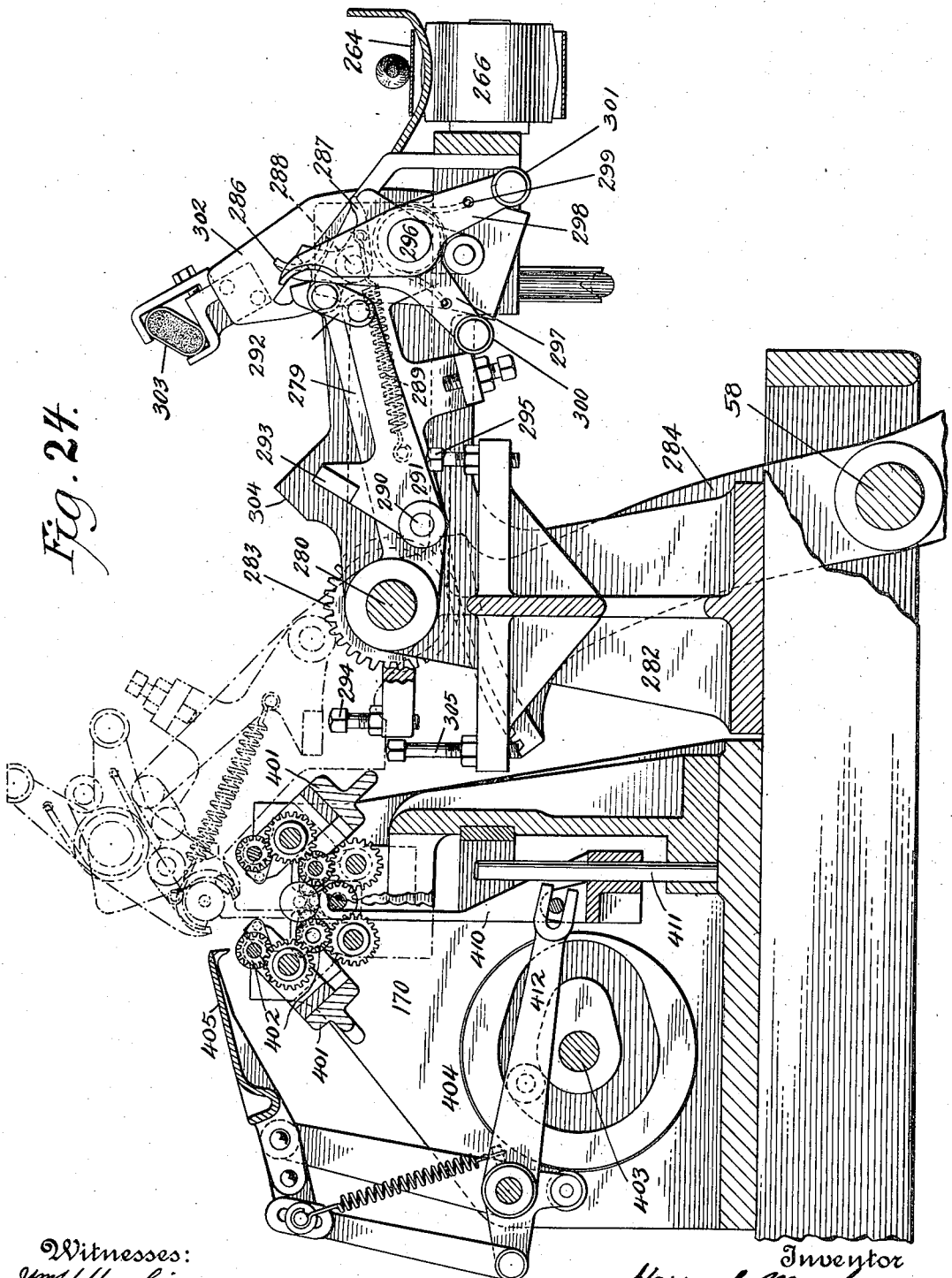

UNITED STATES PATENT OFFICE.

HARRY S. MARSH, OF BROOKLYN, NEW YORK, ASSIGNOR TO INTERNATIONAL CIGAR MACHINERY CO., OF NEW YORK, N. Y., A CORPORATION OF NEW JERSEY.

CIGAR-MACHINE.

1,188,549.

Specification of Letters Patent.  Patented June 27, 1916.

Application filed June 16, 1913. Serial No. 773,926.

*To all whom it may concern:*

Be it known that I, HARRY S. MARSH, a citizen of the United States, residing at Brooklyn, county of Kings, and State of New York, have invented a new and useful Improvement in Cigar-Machines, of which the following is a specification.

This invention relates to an improvement in cigar machines.

The machine selected to illustrate the invention is intended for use in the manufacture of what is known as Toscani cigars. These cigars are made up of a charge of long filler tobacco inclosed in a spirally wound wrapper well covered with paste so that the entire wrapper is pasted to the filler. The cigars are then fermented. No bunch forming mechanism is used and no binder is employed in making a Toscani cigar. Usually the cigar is made of double length and is afterward cut into two individual cigars.

The main object of the present invention is the production of a machine capable of making this type of cigar.

Other objects are the production of mechanisms capable of performing the necessary functions in the manufacture of a Toscani cigar and which are also capable of performing like functions in the manufacture of other types of cigars.

With these and other objects not specifically mentioned in view, the invention consists in certain constructions, combinations, improvements and parts which will be hereinafter fully described and then specifically set forth in the claims hereunto appended.

Figure 1:
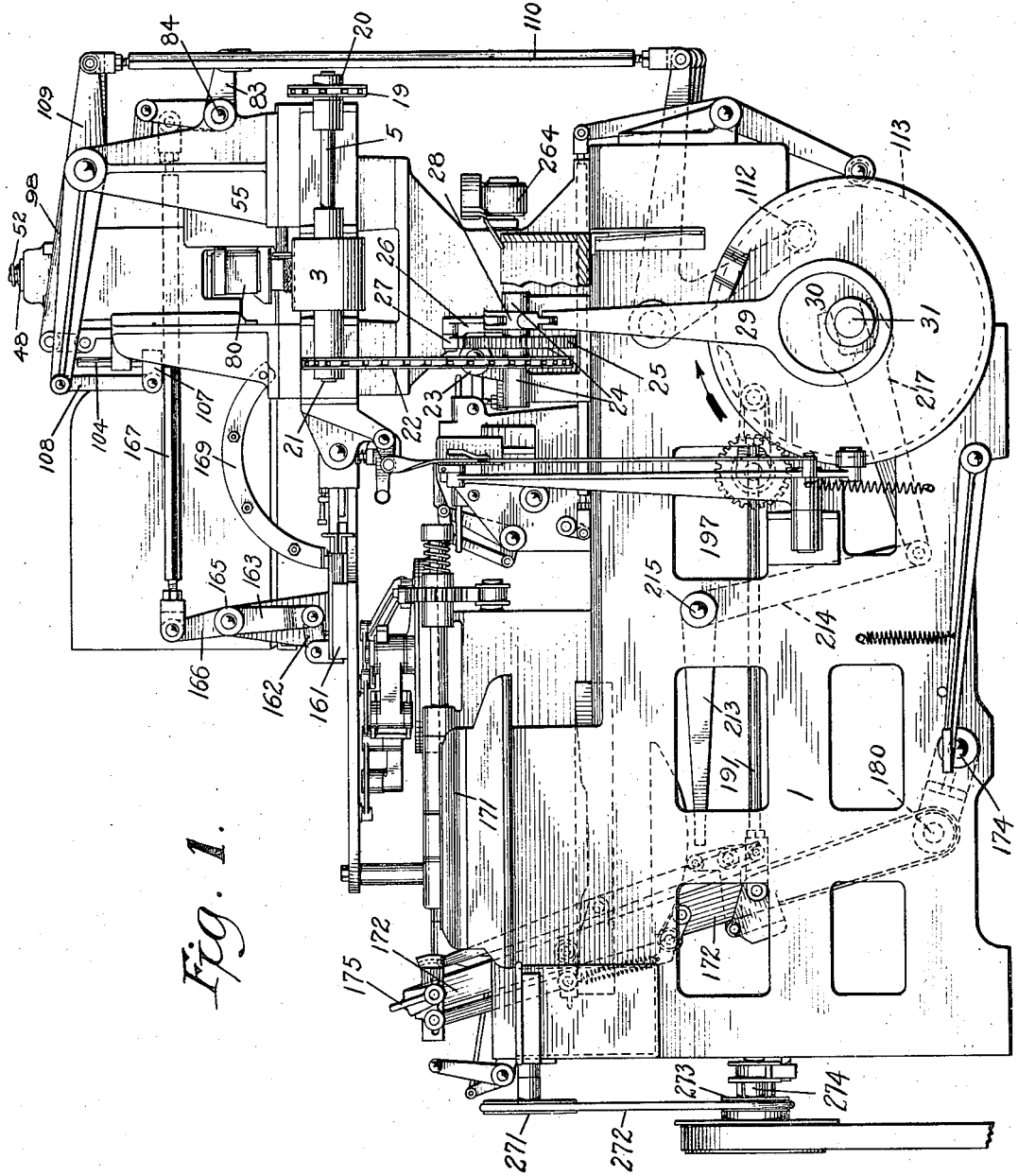
Figure 2:
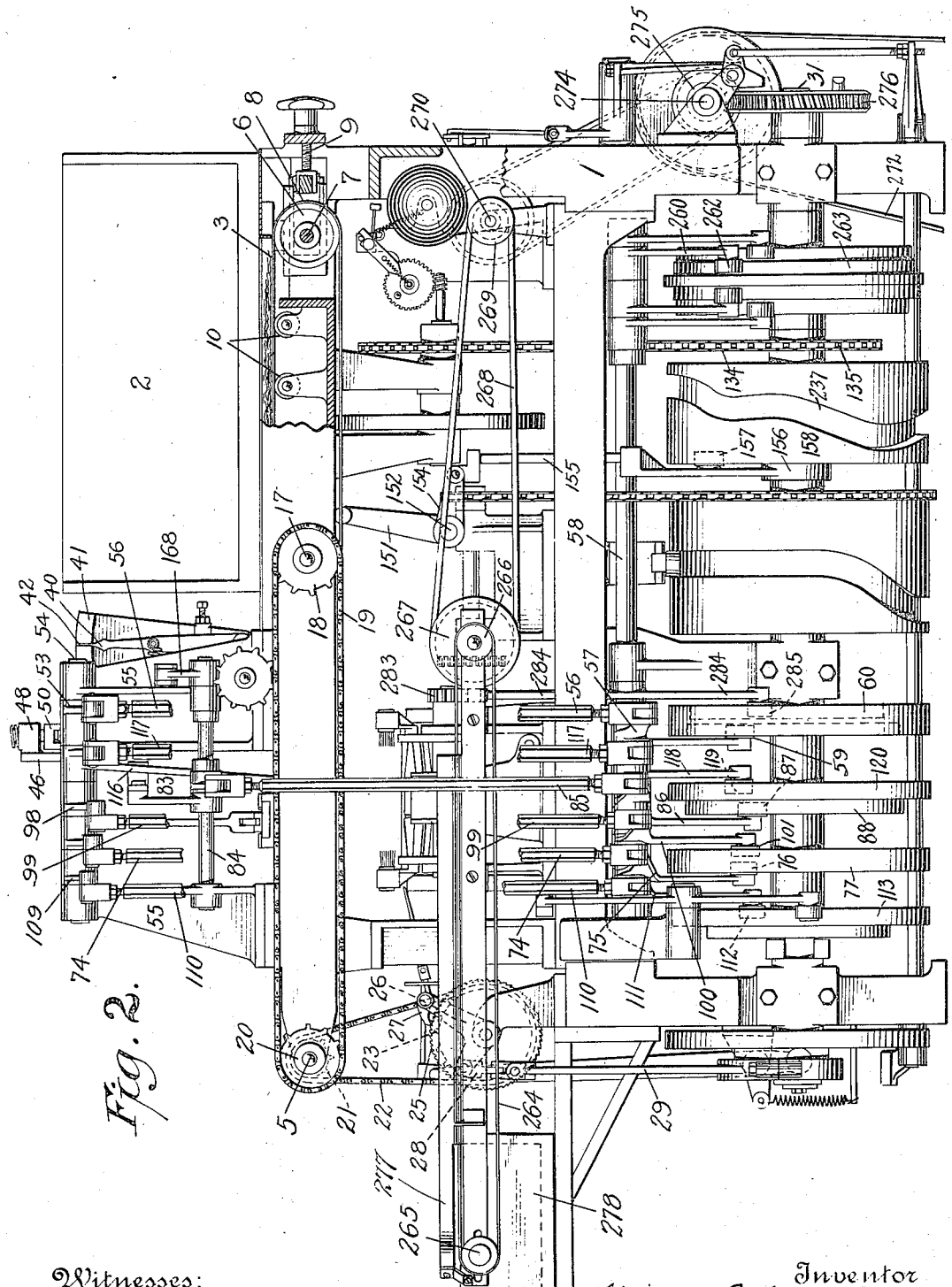
Figure 3:
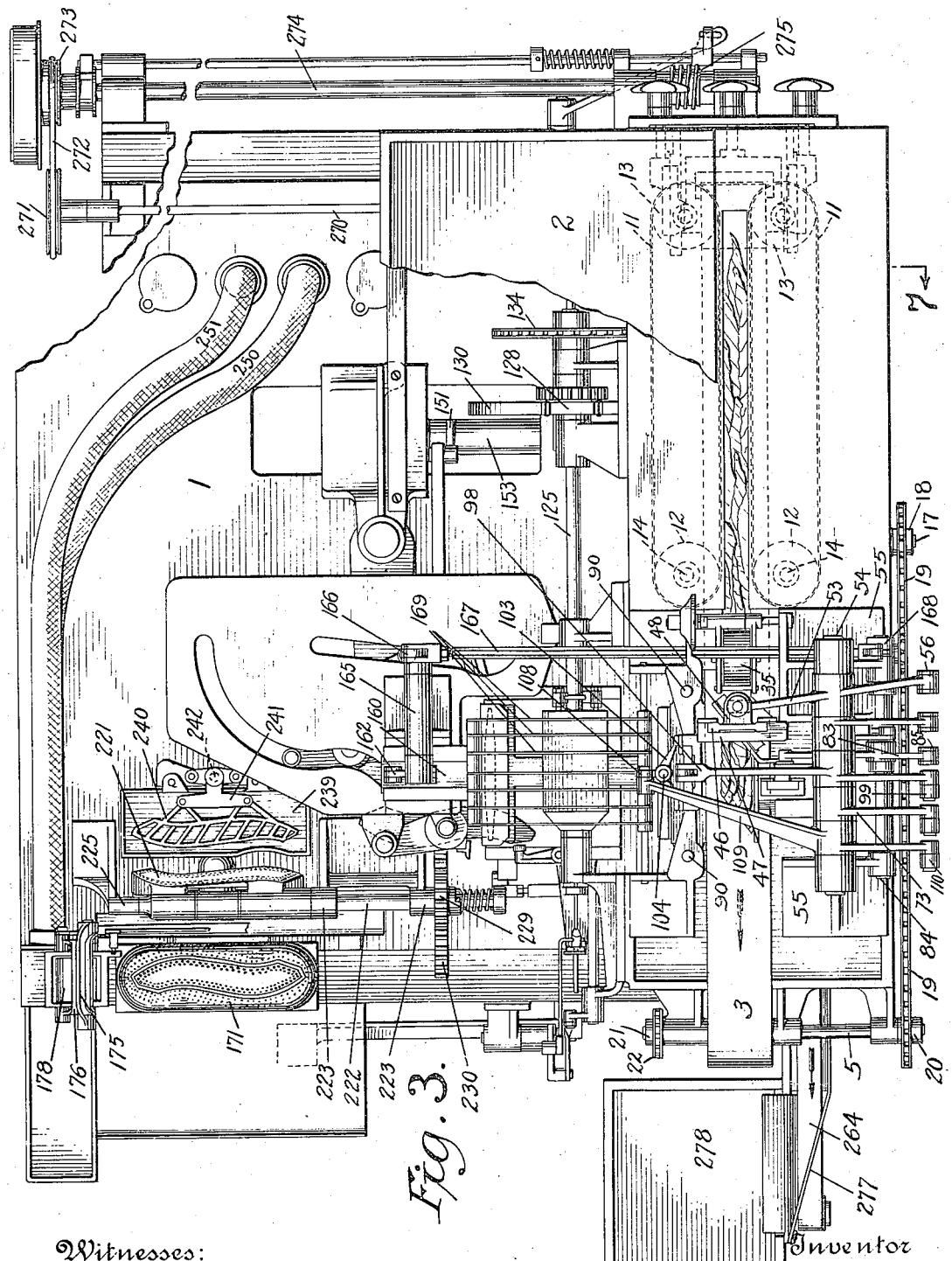
Figure 6:
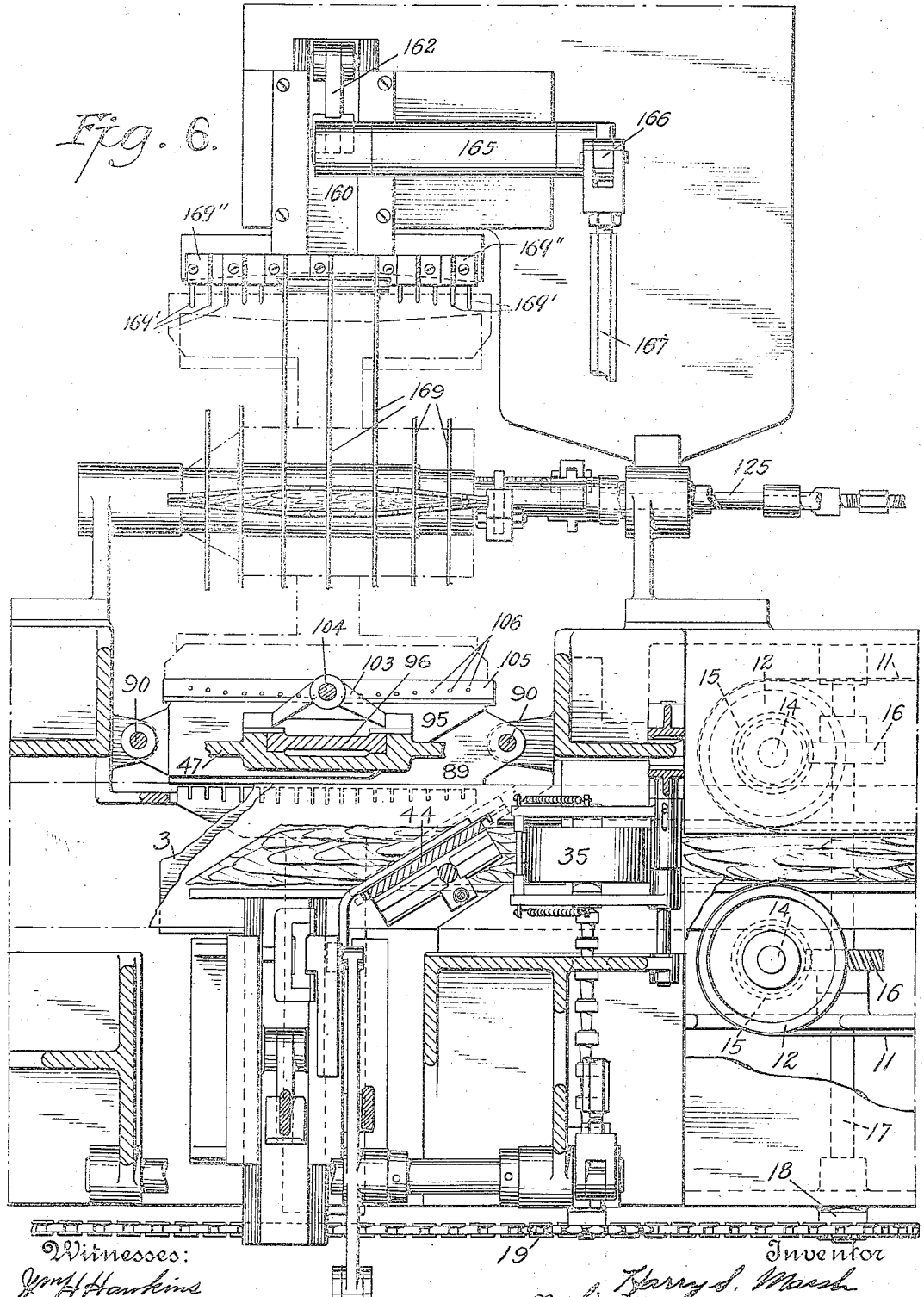
Figure 7:
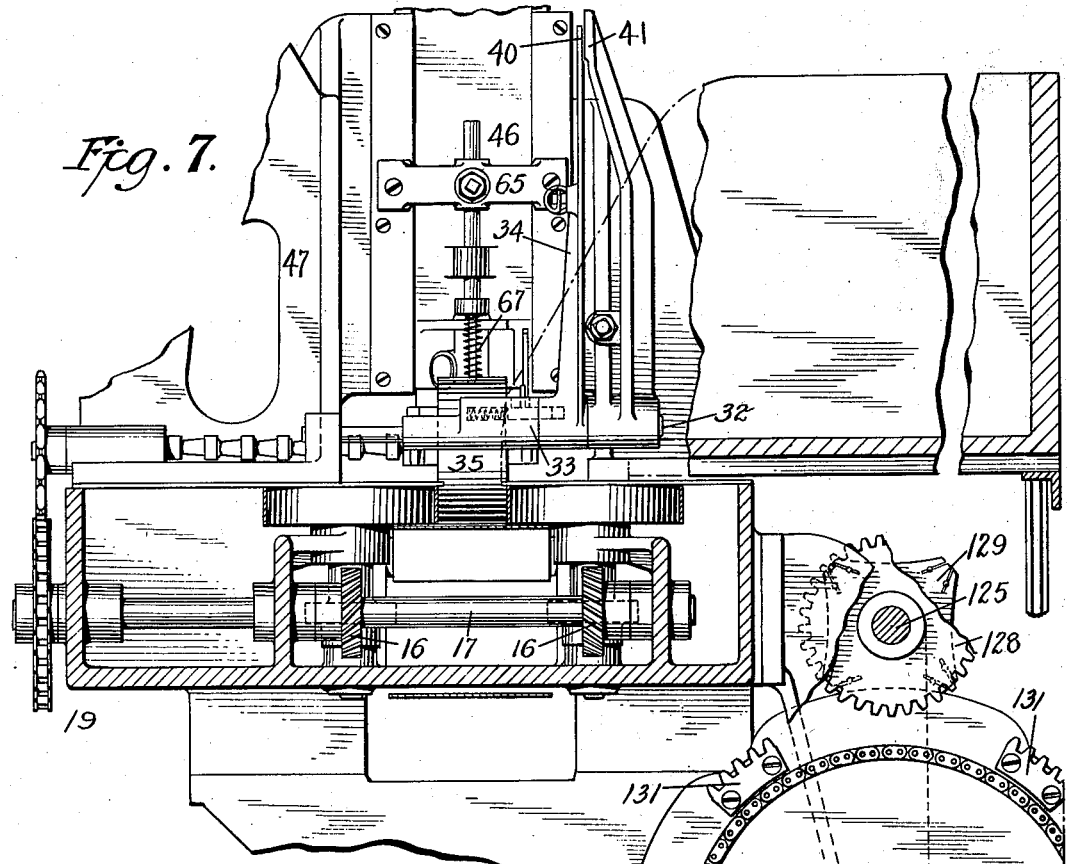
Figure 8:
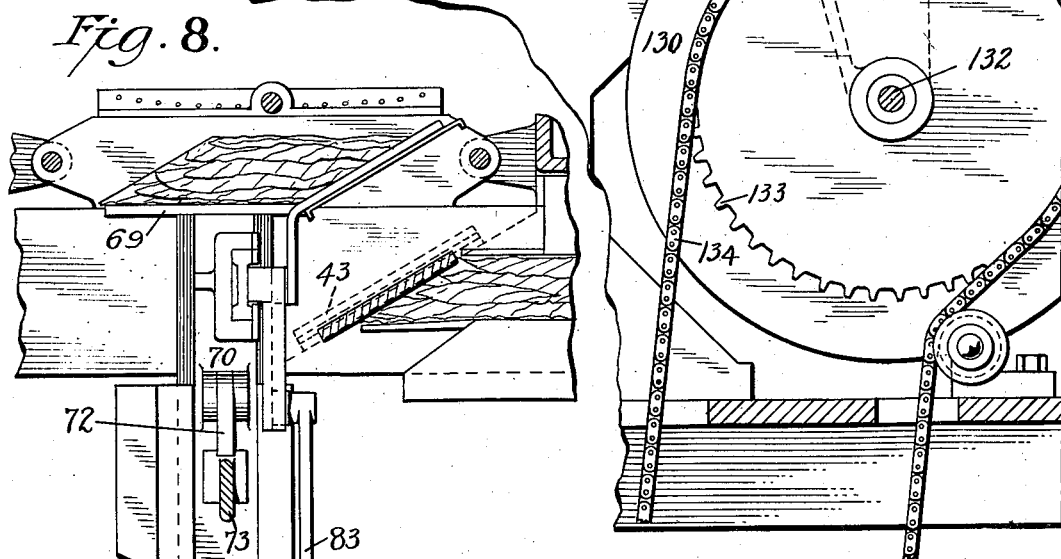
Figure 9:
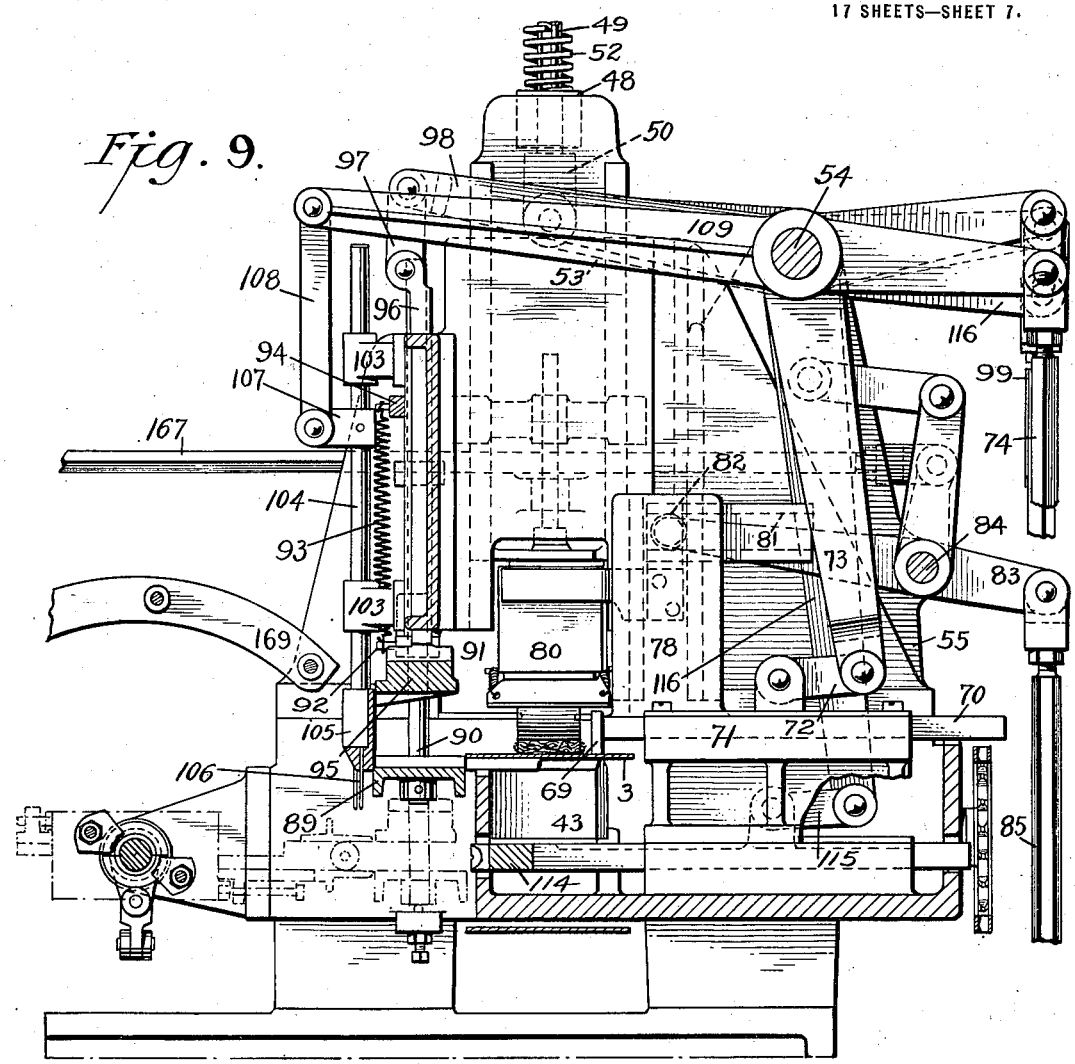
Figure 10:
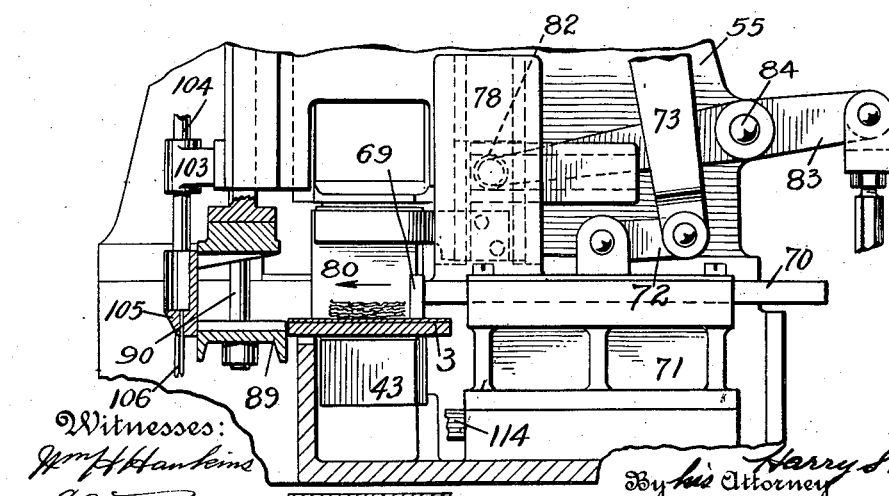
Figure 16:
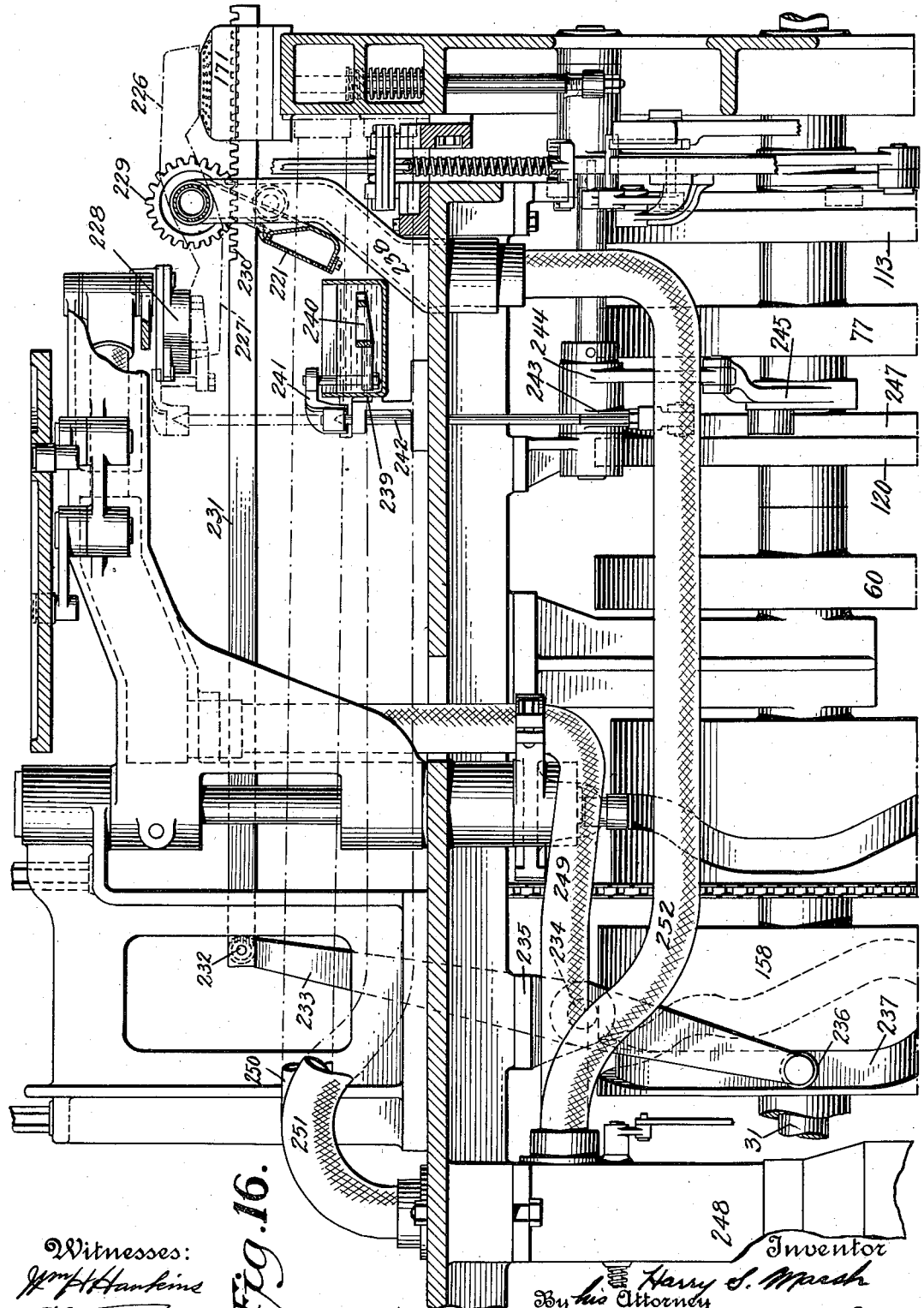

In the drawings, which form a part of this specification and in which like characters of reference indicate the same or like parts, Figure 1 is a front elevation of a machine constructed in accordance with the invention. Figs. 2 and 3 are respectively side elevation and plan view of the machine shown in Fig. 1. Fig. 4 is a detail view upon an enlarged scale showing the mechanism for feeding filler in a mass and the means for separating from said mass a charge of filler sufficient for one cigar. Fig. 5 is a detail view of the charge separating mechanism. Fig. 6 is a plan view of the filler feed and separating mechanism together with the means for compressing the charge after separation. Fig. 7 is a cross-sectional detail view of the filler feeding mechanism taken on the line 7 in Fig. 3. Fig. 8 is a detail plan view of a portion of the feed mechanism and of an elevator by means of which a separated charge is delivered from the feed mechanism to the compressing mechanism. Figs. 9 and 10 are detail views illustrating a portion of the feed mechanism and the elevator for transferring a charge from the feed mechanism to the compressing mechanism. Fig. 11 is an enlarged plan view of the compressing mechanism. Fig. 12 is a cross-sectional view of the compressing mechanism. Figs. 13 and 14 are detail views illustrating the method of transferring compressed charges from the compressing mechanism to a wrapping mechanism. Fig. 15 is a detail plan view showing the cutting bed where the wrapper is cut, the wrapping mechanism and the means for transferring a cut wrapper from the cutting bed to the wrapping mechanism. Fig. 16 is a side elevation of the mechanism shown in Fig. 15 and illustrating the connections whereby suction is employed in transferring a wrapper from the cutting bed to the wrapping mechanism. Figs. 17 and 18 are respectively plan and elevation of a series of valves for controlling the suction in the various parts of the machine. Fig. 19 is a plan view of a cutting bed and its coöperating parts. Fig. 20 is a sectional plan view taken on the line 20 in Fig. 21. Fig. 21 is a sectional side elevation of a cutting bed and its coöperating mechanism. Fig. 22 is a detail view showing the method of mounting the wrapper cutting rolls. Fig. 23 is a detail plan view illustrating the wrapping mechanism and the means for delivering a wrapped bunch therefrom. And Fig. 24 is a side elevation of the structure shown in Fig. 23.

In carrying the invention into effect there is provided a traveling member supporting and forwarding a mass of filler, and means coöperating with said member at a position between its ends for separating a charge from the filler mass while resting upon said member. There is further provided automatically operating means coöperating with the traveling member for indicating the quantity of filler mass on said member. There is further provided means for moving the separated charge from the traveling member, means for moving the separated charge from one plane to another, means for inserting the charge so moved in a compressing device, means for compressing the charge in said compressing device, a wrapping mechanism, means whereby the charge is delivered from the compressing mechanism to the wrapping mechanism, a wrapper cutting device, means for transferring a wrapper from said wrapper cutting device and presenting it to the wrapping mechanism, means for delivering a wrapped charge or cigar from the wrapping mechanism, and means for trimming the ends of the cigar while in transit from the wrapping mechanism.

In the best constructions, the means for separating a charge from the filler mass includes a reciprocating knife coöperating with a belt acting as forwarding means for the filler mass and also acting in conjunction with the knife as a charge separating means. In the best constructions also means are provided for cleaning the knife after each operation. In the best constructions also the means for transferring a separated charge from one plane to another is an elevator to which the charge is delivered from the feeding belt and from which it is delivered to a compressing mechanism having two oppositely disposed retainers and having a step-by-step movement whereby one charge is compressed while another is being received and whereby a compressed charge is delivered to the wrapping mechanism. In the best constructions also a pasting device is employed which operates to apply paste substantially over the whole surface of a wrapper so that the entire wrapper will be pasted to the charge of filler.

All of the above means and mechanisms may be varied in construction within wide limits. The machine selected to illustrate the invention is but one of many possible concrete embodiments of the invention. It is therefore to be understood that the invention is not to be restricted to the precise details of the machine illustrated and described.

Referring to the drawings, 1 indicates the main frame of the machine constructed in a manner well known to mechanics generally and needing no more detailed description. The frame 1 supports a tray 2 adapted to hold a quantity of filler tobacco. Adjacent the side of this tray is a metallic belt 3 running over a driving pulley 4 mounted on a shaft 5. The belt also runs over an idle pulley 6 fast on a shaft 7, which shaft is journaled in a bracket 8 provided with belt tightening mechanism of a well known character and including the screw 9. At adjacent points along the side of the tray 2 the belt 3 runs over idle rollers 10 suitably supported by the frame of the machine. The function of these rollers is to resist the downward thrust exerted by the operator when packing filler tobacco on the belt 3. Running along that portion of the belt 3 in front of the tray 2 are two oppositely disposed belts 11 which run over pulleys 12 and pulleys 13. The pulleys 12 are mounted on shafts 14 which shafts carry spiral gears 15 in mesh with spiral gears 16 fast upon a shaft 17 suitably mounted in the frame of the machine. The shaft 17 carries a sprocket 18 over which runs a chain 19. The chain 19 also runs over a sprocket 20 fast on the shaft 5 before referred to. By this mechanism the belts 11 derive their motion from the same source as the belt 3. The shaft 5 which drives the belts 3 and 11—11, carries a sprocket 21 over which runs a chain 22. This chain 22 also runs over a larger sprocket 23 fast on a short shaft mounted in bearings 24 (see Fig. 1). This shaft also carries a ratchet 25 and supports a bell-crank lever 26. One end of the bell-crank lever 26 carries a pawl 27 adapted for engagement with the ratchet. The other end of the bell-crank lever 26 is provided with a universal joint 28. This universal joint connects it with an eccentric rod 29, the lower end of which coöperates with an eccentric 30 fast upon a shaft 31 which is the main cam shaft of the machine. Mounted over the belt 3, at a point just beyond the tray 2 is a bar 32 and upon this bar is mounted a bell-crank lever 33—34. The arm 33 of the bell-crank lever carries a roller 35 which over-rides the tobacco lying upon the belt 3. Connected to the arm 34 of the bell-crank lever is a spring 36 which is also connected to a post 37 secured to frame of the machine. The function of this spring is to hold the roller 35 down upon the tobacco lying upon the belt 3. The arm 35 further carries a scraper 38, the free end of which is held to the periphery of the roller 35 by means of a spring 39 secured thereto and to a post in the arm 33. If the tobacco placed upon the traveling belt 3 varies in quantity, the roller 35 will be raised or lowered; and this will produce a lateral movement of the arm 34. The arm 34 terminates at its upper end in a pointer 40 which swings across a stationary plate 41 having a central mark at 42 for indicating the proper quantity of tobacco. The pointer 40 and mark 42 are in position to be readily seen by the operator so that the operator can tell whether or not he is feeding the proper quantity of tobacco.

From the mass of filler forwarded by the belt 3 a charge sufficient for one cigar is separated. It will be readily understood that the ends of the leaves of which the filler mass is composed overlie in irregular formation and that it cannot be foreseen where the cut will come in separating a charge from the filler mass. It has been found in practice that in many instances, where endwise moving filler is projected beyond the belt which forwards it and is there cut, short pieces are produced and these short pieces fall out of the end of the charge thereby making it too soft at the end. To prevent this, in the present machine, the charge is cut from the mass while resting upon the forwarding belt and the belt itself constitutes a part of the charge separating mechanism, the coöperating cutting member being operative at a position between the ends of the belt. To support the belt at this position there is provided a bar 43 supported by the frame of the machine and underlying the upper or operative run of the belt 3. This bar runs diagonally across the belt (see Figs. 4, 5 and 8). Over the belt and the bar 43 is a knife 44. This knife is pivoted at 45 to a slide 46 suitably mounted in a bracket 47 rising from the main frame of the machine. The slide 46 has at its upper end a laterally projecting head 48 and in this head is mounted a vertically slidable rod 49. The rod 49 carries a fork 50 below the head 48, and above the head 48 the rod carries adjusting nuts 51. Coiled around the rod 49 between the head 48 and the nuts 51 is a compression spring 52, the function of this spring being to hold the parts just described in the relative positions shown in Fig. 4. The fork 50 is pivotally connected to one end of a lever 53 mounted on a bar 54 carried by brackets 55 rising from the main frame of the machine. The other end of the lever 53 is connected by means of an adjustable connecting rod 56 with one arm of a bell-crank cam lever 57 journaled upon a bar 58 extending across one side of the machine. The other arm of the cam lever 57 carries a bowl 59 tracking in a groove in a cam disk 60 mounted upon the shaft 31 before referred to. The cam groove is shaped to produce a downward movement of the fork 50 and rod 49 at the time when it is desired to separate a charge from the mass of filler lying on the belt 3. Through the agency of the spring 52 this downward movement of the rod 49 also moves the slide 46 downward with a yielding pressure, and this in turn moves the knife 44 downward through the mass of filler to the belt 3 immediately over the belt supporting bar 43. The pivotal connection between the knife 44 and the slide 46 allows the knife to automatically operate so that its edge will find a position parallel to the surface of the belt 3 if for any reason it has not been ground true, or if for any reason the surface of the belt 3 is not in exact parallel relation with the cutting edge of the knife 44. It is obvious that the slide and knife will yield against the action of the spring 52 in the event of any hard foreign substance accidentally getting under the knife and that this will prevent any breakage of the parts in such event.

After a cutting operation, some of the gummy juices exuding from the tobacco will adhere to the edge of the knife and means are provided for cleaning the knife after each cutting operation. This means is illustrated in Figs. 4 and 5. With this end in view, the lower head of the slide 46 is provided with a vertical aperture in which is slidably mounted a plunger 61. Pivoted to the lower end of this plunger is a bar 62 carrying a sheet metal wiper 63. This wiper normally occupies the position shown in Figs. 4 and 5. The plunger is held in the position to which it is moved by means of a friction brake of well-known character and shown in section at 64 in Fig. 4. This brake is mounted in a bracket 65 suitably supported from the bracket 47 before referred to. At a point below this bracket above the head of the slide 46, a short laterally projecting arm 66 is pinned to the plunger 61 and upon the end of this arm is pivoted a rod 67 extending through a suitable aperture in the wiper 63. A spring 68 is coiled around the rod 67 and bears against the arm 66 and against the rear side of the wiper 63. This spring normally holds the wiper in the position shown in Fig. 5. When the knife 44 begins to move down, the head of the slide 46 slides along the plunger 61 which, at this time, is held stationary by means of the brake 64. As the knife moves down, it rocks the wiper 63 against the action of the spring 68 and when the head of the slide 46 reaches the bar 62, it carries it down with it, and this in turn carries the plunger down. On the return or upward stroke of the knife, the head of the slide 46 picks up the bar 62 and returns it to its normal position, and during this movement the wiper 63 rides down the side of the knife and scrapes from it any gum which may be adhering thereto.

From the above it will be readily understood that the charge is severed from the mass of filler while the same is fully supported by the forwarding belt 3, and that no small pieces which may be produced by the cutting or separating action of the knife and belt can fall from proper position.

After a charge has been severed from the mass of filler it is removed from the belt; and while in certain constructions this removal might be effected in other ways, in the device selected to illustrate the invention, it is pushed sidewise from the belt into an elevator which removes it from the plane of the operating surface of the belt to another plane lower down. To effect this result there is provided a plunger 69 (see Figs. 9 and 10) mounted upon the end of a slide 70 which reciprocates in the bracket 71 rising from the main frame of the machine. The slide 70 is connected by means of a link 72 with one end of a bell-crank lever 73. This bell-crank lever is fulcrumed upon the bar 54 before referred to. The other end of the bell-crank lever 73 is connected by means of a connecting rod 74 with one arm of a bell-crank cam lever 75 mounted upon the bar 58 before referred to. The other end of the cam lever 75 carries a bowl 76 tracking in a suitable groove formed in a cam disk 77 mounted upon the shaft 31 before referred to. The cam groove of the disk 77 is shaped to produce a movement of the plunger 69 transversely across the belt 3 immediately after a charge has been severed from the mass. The slide 70 has an upward extension 78 near its forward end and in this extension is mounted a slide 79 (see Figs. 4, 9 and 10). This slide carries a plate 80 resting against the forward side of the knife 44 before referred to; and when the knife moves down, this plate also moves down. The movement of the plate 80, however, is not reversed when the knife is, but it remains down until the knife has been retracted and until the plunger 69 comes into operation to push the separated charge from the belt 3. To effect this result the slide 79 is provided with an elongated groove 81 and in this groove is located a bowl 82 carried by one end of a lever 83 fulcrumed on a shaft 84 supported by the brackets 55 before referred to. The other end of the lever 83 is connected by means of a connecting rod 85 to one end of a bell-crank cam lever 86 fulcrumed on the bar 58 before referred to. The other end of the cam lever 86 carries a bowl 87 tracking in a suitable groove in a cam disk 88 mounted upon the cam shaft 31 before referred to. In Fig. 9, the plate 80 is shown in its normal position. In Fig. 10 it has been moved downward with the knife just before the plunger 69 comes into operation. When the plunger comes into operation, the upward extension 78 of the slide 70 travels forward with said slide 70; the bowl 82 remains in the groove 81 during this movement and also during the return movement. It will be readily understood that when the plunger 69 moves forward, the plate 80 also moves forward with it to remove the charge from the forwarding belt 3. This insures any short pieces which may have been produced by the cutting action from being left behind or from being misplaced.

The plunger 69 moves the charge from the belt to an elevator which operates alongside the belt at the charge removing position. This elevator includes a floor 89 slightly concave longitudinally and carried upon the lower ends of two bars 90. These bars slide in suitable bearings formed in the bracket 47 before referred to. Each of the bars 90 is provided with a collar 91 which contacts with the lower side of the lowermost bearing of the bracket 47. Each of the collars 91 carries a stud 92 to which is secured one end of a spring 93. The upper ends of these springs are secured to studs projecting from a bar 94. The springs normally hold the bars 90 and the floor 89 in the position shown in Figs. 9 and 10. Mounted over the floor 89 is a bar 95 which is also slightly concave longitudinally. This bar 95 is mounted upon a slide 96 movable vertically in ways formed in the bracket 47 before referred to. The upper end of the slide 96 is connected by means of a link 97 with one end of a lever 98 fulcrumed on the bar 54 before referred to. The other end of the lever 98 is connected by means of a connecting rod 99 with one arm of a bell-crank cam lever 100 which is fulcrumed on the bar 58 before referred to. The other arm of the bell-crank cam lever 100 carries a bowl 101 tracking in a cam groove in one side of the cam disk 77 before referred to, which cam disk is mounted upon the shaft 31 before referred to.

Mounted in brackets 103 extending rearwardly from the bracket 47 before referred to is a plunger rod 104. This plunger rod carries at its lower end a head 105 provided with a series of downwardly projecting pins 106. The head 105 forms the rear wall of the elevator. At a point between the brackets 103—103 there is pinned to the plunger rod 104 an arm 107 and to this arm is pivoted one end of a link 108. The other end of this link is pivoted to a lever 109 fulcrumed on the bar 54 before referred to. The other end of the lever 109 is connected by means of a connecting rod 110 to a bell-crank cam lever 111 fulcrumed on the bar 58 before referred to. The other arm of the cam lever 111 carries a bowl 112 tracking in a cam groove formed in the face of the cam disk 113 mounted on the shaft 31 before referred to. The cams controlling the movement of the floor 89, of the bar 95 and of the head 105 are so timed that the bar 95 first moves downward to bring it into contact with the charge lying on the floor 89 after the same has been forced to that position by the plunger 69; then the whole moves downward to the delivery position indicated in dotted lines in Fig. 9, where the opening between the floor 89 and the bar 95 is in register with an ejecting plunger 114, the function of which is to force the charge out from the elevator into a retainer, which in turn carries the charge away from the elevator. This ejector 114 slides in the bracket 71 before referred to and is connected by means of a link 115 to one arm of a bell-crank lever 116 fulcrumed on the bar 54 before referred to. The other end of the bell-crank lever 116 is connected by means of a connecting rod 117 with a bell-crank cam lever 118 which is fulcrumed on the bar 58 before referred to. One end of the bell-crank cam lever 118 carries a bowl 119 tracking in a suitable groove in a cam disk 120 fast on the cam shaft 31 before referred to. The movement of the plunger rod 104 and its head 105 is less than the movement of the floor 89 and the bar 95 so that when the two latter reach their lowermost position, the head 105 lies above the opening between the two so that the charge may be pushed by the ejector 114 from between the floor 89 and the bar 95 into one of the retainers of a compressing mechanism to be hereinafter described. After the ejector 114 has pushed a charge from the elevator into one of the retainers of the compressing mechanism, the head 105 carrying the pins 106 is moved down so that the pins 106 come between the charge and the ejector 114. The parts are shown in this position in Fig. 12 and it will be readily understood that when the ejector 114 is retracted, there will be no danger of any tobacco sticking to and being carried back by the ejector 114.

In the device selected to illustrate the invention, the compressing mechanism includes two retainers 121 (see Figs. 11 to 14 inclusive) which are oppositely disposed and are both carried by a rotatory support 122. This support is a box-like structure within which the retainers and their coöperating parts are readily slidable. The support 122 carries at one end a shaft 123 journaled in the bracket 124 rising from the main frame of the machine. At its other end the support carries a shaft 125 which is journaled in a bracket 126 also rising from the main frame of the machine. The outer ends of the retainers are provided with a series of slots 127 within which the pins 106 before referred to work. The support 122 is given an intermittent rotatory movement for the purpose of transferring the charge from the elevator to any position where the charge is compressed within the retainer and thence to a third position where the charge is ejected from the retainer and delivered to a wrapping mechanism. To effect this purpose the shaft 125 is provided with a spur gear 128 (see Figs. 3, 7, and 12). To this gear is secured a locking block 129 which operates on the periphery of a wheel 130. Located on the face of the wheel 130 are two interrupted gear segments 131 adapted for intermittent engagement with the spur gear 128 before referred to and each adapted to produce a quarter turn of the shaft 125 and support 122. The mechanism just described is the well-known Geneva movement, which needs no more detailed description.

The wheel 130 is fast upon the shaft 132 mounted in suitable bearings supported by the main frame of the machine. The shaft 132 carries a sprocket 133 over which runs a chain 134. This chain also runs over a sprocket 135 fast on the shaft 31 before referred to. The bottom of each retainer is movable and consists of a two-part head 136 formed on a slide 137 operating in the support 122. Each of the retainers 121 has an inwardly extending tail 138 which is slotted at 139 and provided with a lateral boss at 140. Each of the slides 127 carries a stud 141 working in the slot 139 and holding the retainer and the slide 137 together by frictional contact. The boss 140 is provided with an aperture 141 in which is mounted a headed stud 142 which is screwed into one end of the support 122. One side of each of the slides 137 is formed as a rack 143. This rack is in constant engagement with the pinion 144 loosely mounted on the stud 145 which is mounted in the support 122. It is obvious that rotation of either of the pinions 144 will produce a radial movement of the slide 137 with which it coöperates. Each of the pinions 144 is in mesh with a rack 146 longitudinally movable in the support 122. Each of the racks 146 is connected to a yoke 147 (see Fig. 11), which in turn is carried by a slidable rod 148 and this rod 148 is connected by means of a turn buckle 149 to the fork 150 and the fork 150 is pivoted to an arm 151 fast on a shaft 152. The shaft 152 is journaled in a long bearing 153 supported by the frame of the machine and the opposite end of the shaft carries an arm 154 to which is pivoted the upper end of a connecting rod 155. The lower end of the connecting rod is provided with a forked head 156 which straddles the shaft 31 before referred to. The head 156 carries a bowl 157 engaging a suitable cam slot in the face of a cam drum 158, the cam drum being fast on the shaft 31. In Fig. 12, the two retainers are shown in the position in which a charge is delivered to one retainer from the elevator and in which a previously received charge is compressed by the action of a compressing plunger 159 mounted on a slide 160, which slide operates in ways 161 supported by the frame of the machine. The slide 160 is connected by means of a link 162 to an arm 163 fast on a shaft 164 journaled in a bearing 165 rising from the frame of the machine. The other end of the shaft 164 carries an arm 166 to which is secured a connecting rod 167. This connecting rod 167 is connected to an arm 168 fast on the shaft 84 before referred to. This shaft 84 is operated by the connecting rod 85 before referred to and its connections. Arched over the support 122 is a series of plates 169 which serve to hold a charge in a retainer when it is traveling from the receiving position to the compressing position. These plates are stationarily supported by suitable connections to the frame of the machine. At the end of the plates 169 adjacent the compressing mechanism are located a series of bent pins 169' (see Figs. 6 and 12) which serve to hold a charge within a retainer after it passes beyond the plates 169, these pins being held stationary by means of a clamping bar 169'' suitably supported from the frame of the machine. The compressing plunger 159 is provided with a series of slots corresponding to the pins 169' so that the operative face of said plunger passes the pins during the compressing operation. From the compressing position a compressed charge is carried to a position immediately over a wrapping mechanism indicated generally by the reference character 170 (see Figs. 13 and 14). When a retainer reaches the position immediately over the wrapping mechanism, one of the pinions 144 is operated and this projects the retainer containing the compressed charge radially and downwardly toward the rolls of the wrapping mechanism. When the boss 140 of the retainer reaches the head of the stud 142 it is stopped and the slide 137 goes on down a sufficient distance to force the compressed charge out of the retainer into the space between the wrapping rolls. Immediately after the compressed charge has been ejected into the wrapping mechanism, the movement of the slide 137 is reversed, which brings it and the retainer coöperating therewith back to normal position. The support is then given a quarter turn to bring the retainer just emptied into position to receive a new charge.

The wrapping mechanism generally indicated by the reference character 170 is of a type well known in the art and a detailed description thereof is omitted in the interest of brevity. It may be here remarked, however, that this wrapping mechanism includes a series of rollers 400, two of which are mounted in swinging brackets 401 so that the cluster may be opened to receive a charge and to permit the discharge of a wrapped cigar. The rollers are driven by a train of gearing marked 402, deriving its motion from a shaft 403 which shaft also carries a series of cams. The rollers and gears are mounted in a suitable frame 404 supported by the main frame of the machine. The wrapping mechanism also includes a tension plate 405 operated in a well-known manner by one of the cams on the shaft 403. The wrapping mechanism further includes a swinging arm 406 fulcrumed to the frame of said mechanism and connected by means of a link 407 with a cam lever 408, the movement of which is controlled by one of the cams on the shaft 403. The swinging arm 406 carries a pin 409 adapted to swing over the charge which has just been deposited in the cluster of rollers and retain the same therein until the rollers close upon the charge to cause its rotation, as is clearly shown in Fig. 14. The wrapping mechanism is further provided with an ejector 410 sliding on a post 411 and operated by a lever 412, which lever derives its motion from a cam on the shaft 403 before referred to.

In the machine selected to illustrate the invention, there is provided a cutting bed 171 of a type well known in the art and which therefore needs no further description. Upon this cutting bed, as in others of this type, a leaf is spread and held by suction and a wrapper is cut from the leaf while so held. The means for cutting the wrapper includes a lever 172 which is pivoted to a forked link 173 mounted to oscillate on a fixed bar 174 suitably supported by the main frame of the machine. The upper end of the lever 172 carries a forwardly extending hook 175 and between this hook and the main part of the lever is pivoted a frame 176. Mounted in the frame 176 are two cutting rollers 177 and 178. By an inspection of Fig. 22, it will be seen that the axes of these rollers are not parallel but lie at a slight angle to each other. This is for the purpose of causing each roll to operate only along one side of the cutting die 179. It is obvious that since each roll coöperates with one side of the cutting die, the wrapper is completely cut when the rolls pass over the die in one direction. Mounted upon the pivot 180 in the forked link 173 is an arm 181. This arm has a head 182 provided with a recess 183 and in this recess there normally lies a stud 184. This stud is fast in one end of a T lever 185. The T lever is fulcrumed at 186 to a spur 187 extending from the lever 172 and a spring 188 normally holds the stud 184 in engagement with the recess 183. The arm 181 carries a pivot 189 to which is connected a fork 190. This fork is secured to one end of a connecting rod 191 and the other end of the connecting rod is pivoted on a crank pin 192 mounted in an arm 193 fast on a short shaft 194. The shaft 194 is journaled in a bearing 195 formed in a bracket 196 supported on the main frame of the machine. The shaft 194 carries an interrupted gear 197 which coöperates at the proper time with a gear segment 198 mounted on a disk 199 mounted on the shaft 31 before referred to. The relation of the gear segment 198 and the interrupted gear 197 is such that the lever 172 is thrown in one direction during one revolution of the shaft 31 and is thrown in the opposite direction during the next rotation of the shaft 31. Pivoted to the lever 172 at 200 is an arm 201 which carries a bowl 202 tracking on the under side of a curved fixed cam 203 rigidly supported by the main frame of the machine. A spring 204 holds the bowl 202 against the cam 203. Pivoted to the frame 176 is a connecting rod 205 which is connected to an arm 206 pivoted at 207 to the lever 172. This arm 206 carries a bowl 208 tracking on a fixed cam 209 suitably supported in the main frame of the machine. The object of the stationary cams 203 and 209 and their operating connections is to control the movement of the floating lever 172 so that the cutting rolls pass across the cutting bed in a right line. Just prior to the movement of the cutting rolls across the die 179, the suction plate 210 lying within the die is forced downwardly against the action of the spring 211 to expose the cutting edge of the die. With this end in view, the lower end of the plunger 212 supporting the plate 210 is engaged by a bell-crank lever 213—214 loose on a bar 215 which is supported by a bracket 216 and by the main frame of the machine. The free end of the arm 214 of the bell-crank lever 213—214 is pivoted to a forked connecting rod 217, the fork of which straddles the shaft 31. This rod 217 carries a bowl 218 tracking in a cam groove 219 formed in the face of the disk 199 before referred to. For the purpose of partially supporting the weight of the lever 172 and its connections, there is provided a spring 220 one end of which is secured to the frame of the machine and the other end to the pivot 180 before referred to.

In the device selected to illustrate the invention, the wrapper is taken from the cutting bed by a suction carrier 221 (see Figs. 15 and 16) fast upon a shaft 222 mounted in bearings 223 rising from the frame of the machine. One end of the suction carrier 222 is journaled upon a stud 224 carried by a bracket 225 rising from the main frame of the machine. As is clearly shown in Figs. 15 and 16, this suction wrapper carrier is hollow and its interior is in communication with a hollow standard 238 supported in the frame of the machine. After a wrapper has been cut, the suction carrier is swung downward over the cutting bed to the position indicated by broken lines in Fig. 16 at 226. It is then swung to the position indicated by broken lines in Fig. 16 at 227. In the latter position, it is transferred to a wrapper support 228 operating to present wrappers to the wrapping mechanism. This wrapper support 228 and its operating connections are generally well known in the art and a detailed description thereof is therefore omitted in the interest of brevity. The shaft 222 of the wrapper carrier 221 is provided with a gear 229 which is in mesh with a rack 230 formed on a bar 231 extending across the machine and terminating at a pivot 232 which connects it to a cam lever 233. This cam lever 233 is fulcrumed at 234 to a bracket 235 supported by the frame of the machine, and its opposite end carries a bowl 236 operating in a cam groove 237 formed in the cam drum 158 before referred to fast on the shaft 31. After a wrapper has been delivered from the wrapper carrier 221 to the wrapper support 228, it receives a further movement to swing it down to the position shown in Fig. 16. This is for the purpose of permitting the operating mechanism of the wrapper support 228 to move the latter to a position over a paste reservoir 239. Normally submerged in this paste reservoir is a grid 240 carried by a yoke 241. This yoke is fast upon the upper end of a rod 242 slidably mounted in a suitable bearing in the main frame of the machine. The lower end of the rod 242 is connected to one arm of a bell-crank lever 243—244. The bell-crank lever is loosely mounted upon the bar 215 before referred to. The arm 244 of the bell-crank lever is connected to a forked connecting rod 245, the fork of which straddles the shaft 31 before referred to. The rod 245 carries a bowl 246 tracking on a cam 247 fast on the shaft 31 before referred to. When the wrapper support 228 reaches a position immediately over the paste receptacle 239, the grid 240 is raised out of the paste receptacle and carried up into contact with the wrapper previously transferred from the wrapper carrier 221 to the wrapper support 228, as indicated in broken lines in Fig. 16, with the result that paste is smeared substantially over the whole of the surface of the wrapper upon the wrapper support.

For the purpose of controlling the suction in the various suction devices of the machine, there is provided a conduit 248 connected with a suitable suction producing apparatus, not shown, and which constitutes a source of suction. Normally in communication with this source of suction is a series of four branch pipes 249, 250, 251 and 252. For the purpose of providing means for independently controlling the suction in these branch pipes, there is provided a series of flap valves 253, 254, 255 and 256 coöperating respectively with the branch pipes 249, 250, 251 and 252. The valve 253 is mounted upon a shaft 257 which carries an arm 258 pivotally connected to a link 259 which, in turn, is pivotally connected to a cam lever 260. This cam lever 260 is fulcrumed on the bar 58 before referred to. The lever 260 carries a bowl 262 tracking on one of the cams 263 of a four-part cam mounted on the shaft 31 before referred to. Since the mechanisms for operating the valves 253, 254, 255 and 256 are all substantially alike and since they are clearly shown in Figs. 17 and 18, a description of the mechanisms for operating the valves 254, 255 and 256 is omitted in the interest of brevity.

After a charge has been wrapped in the wrapping mechanism 170, it is transferred to a delivery belt 264. This belt runs over pulleys 265 and 266 (see Figs. 2, 23 and 24). The pulley 266 is fast on a short shaft which carries a pulley 267 and over this pulley 267 runs a driving belt 268. The belt 268 also runs over a pulley 269 fast on the shaft 270. At the far end of the shaft 270 is a pulley 271 (see Fig. 3) and over this pulley runs a belt 272 which also runs over a pulley 273 fast on a shaft 274 which is the main power shaft of the machine. This shaft 274 carries a worm 275 meshing with a worm wheel 276 which is fast on the main cam shaft 31 before referred to. At the delivery end of the belt 264 is a deflecting plate 277 which operates to deflect cigars forwarded by the belt from the same into a tray 278 suitably supported by the frame of the machine at the delivery end of the belt. For the purpose of transferring cigars from the wrapping mechanism to the delivery belt 264 there is provided transferring mechanism including an arm 279 (see Figs. 23 and 24), which arm is mounted upon a shaft 280 journaled in bearings 281 formed in an arm 282 rising from the frame of the machine. The shaft 280 is provided with a pinion 283 which is in mesh with a segment lever 284. This segment lever is journaled upon the bar 58 before referred to and its lower end carries a bowl 285 engaging a suitable cam groove in the cam disk 60 before referred to. The cam groove is shaped to produce a movement of the arm 279 from the position shown in full lines in Fig. 24 to the position shown in broken lines in the same figure and the reverse. The arm 279 is provided with a pair of fixed jaws 286 and a pair of movable jaws 287 pivoted to the arm at 288. A spring 289, one end of which is secured to the movable jaw 287 and the other end to the arm, operates to retain the jaws either in open or closed position in a well-known manner. The arm carries a rod 290 and upon each end of this rod beyond the limits of the arm are secured levers 291. Each of these levers is connected by means of a link 292 with one of the movable jaws 287. When the arm is thrown to the position shown in broken lines in Fig. 24, the jaws are open. At the end of this movement, however, a boss 293 formed on one of the levers 291 comes in contact with a stop screw 294, thus stopping the lever 291 while the bracket 279 continues its movement. This results in closing the jaws upon a cigar previously elevated from a position between the rolls of the wrapping mechanism. The return movement of the arm 279 causes one of the levers 291 to come in contact with an adjustable stop screw 295 supported by the bracket 282. This stops the lever 291 while the arm 279 completes its reverse movement. The result is that the jaws are opened and the cigar rolls from between them to the delivery belt 264.

When the cigar comes from the wrapping mechanism its ends are trimmed. In the present device the ends are trimmed in transit from the wrapping mechanism to the delivery belt. To effect this purpose the arm 279 carries two studs 296, one on either side, and upon each of these studs is mounted a pair of shears formed of a leg 297 and a leg 298. These shears are normally held in open position by means of a spring 299 coiled around the studs 296 and connected with each of the legs 297 and 298. The ends of the legs 297 and 298 are respectively provided with rollers 300 and 301. As the arm swings over toward the delivery belt, the rollers 300 and 301 come in contact with a stationary cam 302. This cam is shaped to spread the legs and cause the cutting edges of the shears to operate upon the ends of the cigar and to trim them just prior to the opening of the jaws. For the purpose of cleaning any gum from the tobacco that may adhere to the cutting edges of the shears there are provided two brushes 303 mounted in fixed position adjacent the path of movement of the shears. As the arm swings over from the delivery position to the receiving position over the wrapping mechanism, the cutting edges of the shears are wiped clean by the brushes.

For the purpose of limiting the movement of the arm toward the wrapping mechanism, the arm is provided with a ledge 304 which comes in contact with an adjustable stop screw 305 supported by the bracket 282.

In view of the foregoing, a detailed description of the operation of the device is deemed unnecessary and is therefore omitted in the interest of brevity.

What is claimed is:

1. In a cigar machine, the combination with a metallic traveling member supporting and forwarding a mass of filler endwise, of means coöperating with said member at a position between its ends for cutting a charge from the filler mass while resting upon said member.

2. In a cigar machine, the combination with a metallic traveling member supporting and forwarding a mass of filler endwise, of a knife coöperating with said member at a position between its ends for separating a charge from the filler mass while resting upon said member.

3. In a cigar machine, the combination with a metallic traveling member supporting and forwarding a mass of filler endwise and horizontally, of a knife reciprocating in vertical planes and coöperating with said member at a position between its ends for separating a charge from the filler mass while resting upon said member.

4. In a cigar machine, the combination with a metallic flexible traveling member supporting and forwarding a mass of filler endwise, of means coöperating with said member at a position between its ends for cutting a charge from the filler mass while resting upon said member.

5. In a cigar machine, the combination with a metallic flexible traveling member supporting and forwarding a mass of filler endwise, of means coöperating with said member at a position between its ends for cutting a charge from the filler mass while resting upon said member, and means for rigidly supporting the flexible traveling member at the position where the cutting means coöperates with said traveling member.

6. In a cigar machine, the combination with a metallic traveling belt supporting and forwarding a mass of filler endwise, of means coöperating with said belt at a position between its ends for cutting a charge from the filler mass while resting upon said belt.

7. In a cigar machine, the combination with a metallic traveling belt supporting and forwarding a mass of filler endwise, of a knife coöperating with said belt at a position between its ends for separating a charge from the filler mass while resting upon said belt.

8. In a cigar machine, the combination with a metallic traveling member supporting a mass of filler endwise, means for giving the traveling member an intermittent movement to forward the mass of filler supported thereby, and means coöperating with said member at a position between its ends and while said member is stationary for cutting a charge from the filler mass resting upon said member.

9. In a cigar machine, the combination with a metallic traveling member supporting and forwarding a mass of filler endwise, of means coöperating with said member at a position between its ends for cutting a charge from the filler mass while resting upon said member, and automatically operating means coöperating with the traveling member for indicating the quantity of filler mass on said member.

10. In a cigar machine, the combination with a metallic traveling member supporting and forwarding a mass of filler, of a knife coöperating with said member at a position between its ends for separating a charge from the filler mass while resting upon said member, and means for cleaning the knife after each separating operation.

11. In a cigar machine, the combination with a metallic traveling member supporting and forwarding a mass of filler endwise, of means coöperating with said member at a position between its ends for cutting a charge from the filler mass while resting upon said member, and means for removing the separated charge from the traveling member.

12. In a cigar machine, the combination with a metallic traveling member supporting and forwarding a mass of filler, of means coöperating with said member at a position between its ends for cutting a charge from the filler mass while resting upon said member, and a plunger and operative connections for removing the separated charge from the traveling member.

13. In a cigar machine, the combination with a traveling member supporting and forwarding a mass of filler, of means coöperating with said member at a position between its ends for cutting a charge from the filler mass while resting upon said member, and means including operative connections and a plunger reciprocating across the path of movement of the filler mass for removing a separated charge from said member.

14. In a cigar machine, the combination with a traveling member supporting and forwarding a mass of filler, of means coöperating with said member at a position between its ends for cutting a charge from the filler mass while resting upon said member, means for removing a separated charge from said member, an elevator to which the removing means delivers a separated charge, and operative connections whereby the elevator is caused to transfer the separated charge from the plane of the filler mass to another plane.

15. In a cigar machine, the combination with a traveling member supporting and forwarding a mass of filler, of means coöperating with said member at a position between its ends for cutting a charge from the filler mass while resting upon said member, means for removing a separated charge from said member, an elevator to which the removing means delivers a separated charge, operative connections whereby the elevator is caused to transfer the separated charge from the plane of the filler mass to another plane, and means for ejecting the charge from the elevator.

16. In a cigar machine, the combination with a traveling member supporting and forwarding a mass of filler, of means coöperating with said member at a position between its ends for cutting a charge from the filler mass while resting upon said member, means for removing the separated charge from said member, an elevator to which the removing means delivers a separated charge, operative connections whereby the elevator is caused to transfer the separated charge from the plane of the filler mass to another plane, means for ejecting the charge from the elevator and a compressing mechanism to which the ejector delivers the charge from the elevator.

17. In a cigar machine, the combination with a traveling member supporting and forwarding a mass of filler, of means coöperating with said member at a position between its ends for cutting a charge from the filler mass while resting upon said member, means for removing the separated charge from said member, an elevator to which the removing means delivers the separated charge, operative connections whereby the elevator is caused to transfer the separated charge from the plane of the filler mass to another plane, means for ejecting the charge from the elevator, a compressing mechanism to which the ejector delivers the charge from the elevator, and a wrapping mechanism to which the compressing mechanism delivers the compressed charge.

18. In a cigar machine, the combination with a traveling member supporting and forwarding a mass of filler, of means coöperating with said member at a position between its ends for cutting a charge from the filler mass while resting upon said member, means for removing the separated charge from said member, an elevator to which the removing means delivers the separated charge, operative connections whereby the elevator is caused to transfer the separated charge from the plane of the filler mass to another plane, means for ejecting the charge from the elevator, a compressing mechanism to which the ejector delivers the charge from the elevator, a wrapping mechanism to which the compressing mechanism delivers the compressed charge, and means for supplying a wrapper to the wrapping mechanism.

19. In a cigar machine, the combination with a traveling member supporting and forwarding a mass of filler, of means coöperating with said member at a position between its ends for cutting a charge from the filler mass while resting upon said member, means for removing the separated charge from said member, an elevator to which the removing means delivers the separated charge, operative connections whereby the elevator is caused to transfer the separated charge from the plane of the filler mass to another plane, means for ejecting the charge from the elevator, a compressing mechanism to which the ejector delivers the charge from the elevator, a wrapping mechanism to which the compressing mechanism delivers the compressed charge, means for cutting a wrapper, and means for delivering the cut wrapper to the wrapping mechanism.

20. In a cigar machine, the combination with a traveling member supporting and forwarding a mass of filler, of means coöperating with said member at a position between its ends for cutting a charge from the filler mass while resting upon said member, means for removing the separated charge from said member, an elevator to which the removing means delivers the separated charge, operative connections whereby the elevator is caused to transfer the separated charge from the plane of the filler mass to another plane, means for ejecting the charge from the elevator, a compressing mechanism to which the ejector delivers the charge from the elevator, a wrapping mechanism to which the compressing mechanism delivers the compressed charge, means for cutting a wrapper, means for delivering the cut wrapper to the wrapping mechanism, and means for discharging the wrapped charge from the wrapping mechanism.

21. In a cigar machine, the combination with a long filler charge retainer, of means for moving the retainer in an orbital path, and means adjacent the path of the retainer at a fixed point between the charge receiving and delivering positions for compressing a charge in the retainer.

22. In a cigar machine, the combination with a long filler charge retainer, of means for producing a step-by-step movement of the retainer in an orbital path, and means adjacent the path of and coöperating with the retainer at a fixed point between the charge receiving and delivering positions for compressing a charge in said retainer while it is at rest.

23. In a cigar machine, the combination with a plurality of long filler charge retainers, of means for producing a step-by-step movement of said retainers in an orbital path, means for inserting a charge in one of the retainers, and simultaneously operating means adjacent the path of and coöperating with another retainer at a fixed point between the charge receiving and delivering positions for compressing a charge therein.

24. In a cigar machine, the combination with two oppositely disposed long filler charge retainers, of a common support for said retainers, means for producing a step-by-step rotatory movement of the support, means for inserting a charge in one of the retainers, and simultaneously operating means adjacent the path of and coöperating with the other retainer at a fixed point between the charge receiving and delivering positions for compressing the charge therein.

25. In a cigar machine, the combination with two oppositely disposed long filler charge retainers, of a common support for said retainers, means for producing a step-by-step rotatory movement of the support, means for inserting a charge in one of the retainers, simultaneously operating means adjacent the path of and coöperating with the other retainer at a fixed point between the charge receiving and delivering positions for compressing the charge therein, and means for ejecting a compressed charge from the retainer.

26. In a cigar machine, the combination with two oppositely disposed charge retainers, of a common support for said retainers, means for producing a step-by-step rotatory movement of the support, means for inserting a charge in one of the retainers, simultaneously operating means adjacent the path of and coöperating with the other retainer for compressing the charge therein, a wrapping mechanism, and means for ejecting a compressed charge from one of the retainers and transferring it to the wrapping mechanism.

27. In a cigar machine, the combination with two oppositely disposed charge retainers, of a common support for said retainers, means for producing a step-by-step rotatory movement of the support, a charge elevator, means for transferring the charge from the elevator to one of the retainers, simultaneously operating means adjacent the path of and coöperating with the other retainer for compressing the charge therein, a wrapping mechanism, and means for ejecting a compressed charge from one of the retainers and transferring it to the wrapping mechanism.

28. In a cigar machine, the combination with a wrapper cutting bed, of a pair of rollers coöperating with the cutting bed, a floating lever carrying the rollers at one of its ends, a link support at the other end of the lever, means for moving the lever, and cams controlling the movement of the lever to cause the rollers to pass across the cutting bed in a right line.

29. In a cigar machine, the combination with a wrapper cutting bed, of a pair of rollers coöperating with the cutting bed, a floating lever carrying the rollers at one of its ends, a link support at the other end of the lever, means for moving the lever, cams controlling the movement of the lever to cause the rollers to pass across the cutting bed in a right line, and trip mechanism for throwing the floating lever out of action when the rollers meet an obstruction on the cutting bed.

30. In a cigar machine, the combination with a movable wrapper support, of a paste receptacle located beneath one position in the movement of the wrapper support, a grid of substantially the outline of the wrapper and normally submerged in paste in the receptacle, and means for elevating the grid to apply paste substantially to the whole surface of a wrapper on the wrapper support.

31. In a cigar machine, the combination with a wrapping machanism, of a wrapper support having a movement whereby it receives a wrapper in one position and delivers said wrapper to the wrapping mechanism at another position, a paste receptacle located beneath the wrapper support when it is in wrapper receiving position, a grid of substantially the outline of the wrapper and normally submerged in paste in the receptacle, and means for elevating the grid to apply paste substantially to the whole surface of a wrapper on the wrapper support.

32. In a cigar machine, the combination with a wrapping mechanism, of a cigar delivery belt, means for transferring a wrapped cigar from the wrapping mechanism to the delivery belt, shears carried by the transferring means for trimming the ends of the cigar in transit, and brushes stationarily held adjacent the path of movement of the shears for cleaning the same after each shearing operation.

33. In a cigar machine, the combination with means for rotating a filler, of a wrapper support, means for applying paste substantially to the whole surface of a wrapper on the wrapper support, and means for producing a relative movement of the filler rotating means and the wrapper support to cause the paste covered wrapper to be wound around and pasted to the filler.

34. In a cigar machine, the combination with means for compressing a filler, of means for rotating the filler, means for transporting the filler from the compressing means to the rotating means, a wrapper support, means for applying paste substantially to the whole surface of a wrapper on the wrapper support, and means for producing a relative movement of the filler rotating means and the wrapper support to cause the paste covered wrapper to be wound around and pasted to the filler.

35. In a cigar machine, the combination with means for forming a filler, of means for rotating the filler, a wrapper support, means for applying paste substantially to the whole surface of a wrapper on the wrapper support, and means for producing a relative movement of the filler rotating means and the wrapper support to cause the paste covered wrapper to be wound around and pasted to the filler.

36. In a cigar machine, the combination with means for forming a filler, of means for compressing the filler, means for rotating the filler, means for transporting the filler from the forming means to the compressing means and then to the rotating means, a wrapper support, means for applying paste substantially to the whole surface of a wrapper on the wrapper support, and means for producing a relative movement of the filler rotating means and the wrapper support to cause the paste covered wrapper to be wound around and pasted to the filler.

37. In a cigar machine, the combination with means for feeding a mass of filler tobacco, of means for cutting a filler therefrom, means for rotating the filler, a wrapper support, means for applying paste substantially to the whole surface of a wrapper on the wrapper support, and means for producing a relative movement of the filler rotating means and the wrapper support to cause the paste covered wrapper to be wound around and pasted to the filler.

38. In a cigar machine, the combination with means for feeding a mass of filler tobacco, of means for cutting a filler therefrom, means for compressing the cut filler, means for rotating the filler, means for transporting the filler from the cutting means to the compressing means and then to the rotating means, a wrapper support, means for applying paste substantially to the whole surface of a wrapper on the wrapper support, and means for producing a relative movement of the filler rotating means and the wrapper support to cause the paste covered wrapper to be wound around and pasted to the filler.

39. In a cigar machine, the combination with means for rotating a filler, of a wrapper support, means for applying paste substantially to the whole surface of a wrapper on the wrapper support, means for producing a relative movement of the filler rotating means and the wrapper support to cause the paste covered wrapper to be wound around and pasted to the filler, cigar finishing means, and means for transporting a wrapped cigar from the filler rotating means to the cigar finishing means.

In testimony whereof, I have signed my name to this specification in the presence of two subscribing witnesses.

HARRY S. MARSH.

Witnesses:
SYDNEY I. PRESCOTT,
ELIZABETH LOUISE RUSSELL.